(12) United States Patent
Sidwell et al.

(10) Patent No.: US 6,300,952 B1
(45) Date of Patent: Oct. 9, 2001

(54) GENERATION AND USE OF COMPRESSED IMAGE DATA

(75) Inventors: Nathan Sidwell; David Stuttard, both of Bristol (GB)

(73) Assignee: Science Research Foundation, Bristol (GB)

( * ) Notice: Subject to any disclaimer, the term of this patent is extended or adjusted under 35 U.S.C. 154(b) by 0 days.

(21) Appl. No.: 09/162,560

(22) Filed: Sep. 29, 1998

(30) Foreign Application Priority Data

Sep. 29, 1997 (GB) ................................... 9720677

(51) Int. Cl.⁷ .................................................. G06T 15/00
(52) U.S. Cl. ............................................ 345/419; 345/420
(58) Field of Search ...................... 345/419, 420

(56) References Cited

U.S. PATENT DOCUMENTS

| | | | | |
|---|---|---|---|---|
| 5,010,502 | * | 4/1991 | Diebel et al. ........................ | 364/522 |
| 5,684,935 | * | 11/1997 | Demesa, III et al. ................ | 395/119 |
| 5,867,166 | * | 2/1999 | Myhrvold et al. .................... | 345/419 |
| 6,014,143 | * | 1/2000 | Naqvi et al. .......................... | 345/424 |
| 6,044,181 | * | 3/2000 | Szeliski et al. ....................... | 382/284 |
| 6,064,393 | * | 5/2000 | Lengyel et al. ....................... | 345/427 |
| 6,072,497 | * | 6/2000 | Lichtenbelt et al. ................. | 345/424 |

* cited by examiner

Primary Examiner—Mark Zimmerman
Assistant Examiner—Enrique L Santiago
(74) Attorney, Agent, or Firm—Cook, Alex, McFarron, Manzo, Cummings & Mehler, Ltd.

(57) ABSTRACT

A method and computer system are described for generating compressed image data, and for rendering pixel data using the compressed image data.

A plurality of hulls are defined in the image, each hull being defined as a set of polygons in a desired coordinate system. For at least some of said hulls, a portal is defined, each portal being defined as a set of point in the designated coordinate system for that hull. A viewing transform allows the portal to be mapped to another, target hull. A data structure is stored which holds the defined hulls and portals in a manner describing their physical relationship in the image. The data structure can be transmitted via a number of different mediums and represents the compressed image data which can be used to generate pixel data to generate an image at a remote location.

26 Claims, 11 Drawing Sheets

GENERATION AND USE OF COMPRESSED IMAGE DATA

This invention relates to the generation and use of compressed image data. In particular, it relates to a method and computer system for generating compressed image data, and to a method and image rendering device for rendering pixel data using the compressed image data.

The invention is particularly concerned with graphics data which is intended for display on a monitor associated with a computer system or some other control means including a processor means. For instance, the display may be the monitor of a computer system, the graphics data generated being stored on the memory of the computer system or on, for instance, a CD-ROM and being retrieved for rendering to the monitor of the computer system. Alternatively, the compressed image data for rendering to the monitor may be retrieved from a remote source. It is a characteristic of such systems that the image rendering device which displays the compressed image data has associated therewith a user interface which enables user interaction.

One objective for the local image rendering device is to allow pixel data to be rendered for display with the minimum amount of time.

An objective for forming the compressed image data from the image source is to represent the original image in a useful format which allows rendering time to be kept to a minimum yet results in a flexible and useful system. A particularly useful feature of flexibility is to allow the display system to receive compressed image data from a number of different image sources without significantly altering the rendering time for display of the pixel data on the local display. Another desirable feature is to reduce the amount of unnecessary pixel data which is generated, particularly in respect of objects which are invisible in the final display.

One known data structure according to which compressed image data is transmitted is a Binary Space Partition (BSP) tree according to which polygons defined in the image to be rendered are held in an index in which each polygon is identified as a list of a number of identifiers. According to a convention, each polygon is identified by three identifiers such that they are mapped onto triangles, but this is not essential. The data structure includes a list which maps each identifer onto a point defined in Cartesian coordinates (X,Y,Z). Using this basic format, a BSP tree is established for an image by a process of allocating subdividing polygons. The BSP tree is a useful format for compressed image data, although it does have some limitations.

One of these is that, in rendering an image from compressed image data stored as a BSP tree, pixel data may be generated for polygons that are not in fact visible in the final display. This thus is a waste of processing time.

Moreover, some polygons are required to be split up during formation of the BSP tree so that effectively two polygons have to be created for a single polygon in the image.

According to one aspect of the present invention there is provided a method of generating compressed image data defining a 3-D image to be rendered in 2-D comprising:

defining in the image a plurality of hulls, each hull being defined as a set of polygons in a designated coordinate system;

defining for each of at least some of said hulls a portal, each portal being defined as a set of points in the designated coordinate system for that hull and a viewing transform for mapping the portal to another, target hull; and storing a data structure which holds the defined hulls and portals in a manner describing their physical relationship in the image, the data structure representing the compressed image data.

By defining hulls and portals, a number of different advantages can be obtained.

The viewing transform for each portal that allows one hull to be matched to another allows hulls to be generated on independent coordinate systems which can be related by the viewing transform. Thus, it is possible to provide compressed image data from a number of different image sources each providing their own hulls and portals, provided that the viewing transforms allow for this mapping.

Another advantage is that there is much more flexibility about the arrangement of hulls within the image. The physical relationship of hulls can be changed relative to one another by altering the viewing transforms of the portals. Importantly, this allows for an easy technique for coping with moving objects within an image.

The use of portals also allows clipping to be effected when an image is rendered, for example by frustrum culling so that only that part of a hull which can be seen through the portal from the defined user viewpoint is rendered.

A portal maps the coordinate set of one hull into another, and a transformation is provided to achieve this. Thus, a transformation may map a target hull to a source hull. The definition of each portal may also include an inverse viewing transform. The inverse viewing transform maps the source hull to the target hull. The provision of such inverse transforms allows a viewpoint to move through a portal from a source hull into a target hull.

In the preferred embodiment the data structure comprises an index in which each polygon is stored as a group of identifiers, and a list in which each identifier denotes a point in the designated coordinate system. Typically, a Cartesian coordinate system could be used. A suitable form of data structure is a BSP tree. The data structure can also hold for each polygon, polygon properties such as colour, texture and normals.

In the described embodiment, each portal is defined as a convex quadrilateral by four points. This renders clipping techniques such as frustum culling particularly simple. However, portals of other shapes can be defined.

The method of the invention is particularly useful when applied to an image in which objects are moving. Moving objects are defined in the data structure as respective sub-hulls, each with an associated moving portal in the hull containing the sub-hull. Thus a nomad is a moving portal within a hull, the moving portal mapping into that hull a sub-hull.

The invention also provides a method of operating a computer system to generate compressed image data defining a 3-D image to be rendered in 2-D, comprising:

displaying a representation of the 3-D image on a display;

operating a user interface to define in the representation of the image a plurality of hulls and, for each of at least the sum of said hulls, a portal, wherein the computer system defines each hull as a set of polygons in a designated coordinate system, and defines each portal as a set of points in the designated coordinate system for that hull and a viewing transform for mapping the portal to another, target hull; and storing in a memory of the computer system a data structure which holds the defined hulls and portals in a manner describing their physical relationship in the image, the data structure representing the compressed image data.

The invention also provides a computer system for generating compressed image data defining a 3-D image to be rendered in 2-D, the data server comprising:

an interface for allowing a user to define in a representation of the 3-D image a plurality of hulls and, for each of at least some of said hulls, a portal;

a processor for defining each hull as a set of polygons in a designated coordinate system, and each portal has a set of points in the designated coordinate system for the hull with which it is associated and a viewing transform for mapping the portal to another, target hull; and a memory holding a data structure which holds the defined hulls and portals in a manner describing their physical relationship in the image, the data structure representing the compressed image data.

According to another aspect of the present invention there is provided a method of rendering an image from compressed image data which is in the form of a data structure which holds data defining hulls and portals in a manner describing their physical relationship in the image, wherein each hull is defined as a set of polygons in a designated coordinate system and has a portal defined as a set of points in that designated coordinate system and a viewing transform for mapping that portal to another, target hull, the method comprising:

traversing the data structure according to a selected view point and selecting for rendering hulls and portals visible from that viewpoint;

rendering the visible hulls and portals in sequence by generating pixel data from the data held in the data structure for each hull and portal; and when a portal is encountered, rendering the target hull according to the viewing transform associated with that portal.

This method allows for the use of compressed image data in the form defined in the first aspect of the invention so as to render images in a time effective manner. The view transforms associated with the portals are used to greatly simplify rendering of the hulls as pixel data.

This aspect of the invention also provides an image rendering device having a communications interface for receiving compressed image data which is in the form of a data structure which holds data defining hulls and portals in a manner describing their physical relationship in an image, wherein each hull is defined as a set of polygons in a designated coordinate system and has a portal defined as a set of point in that designated coordinate system and a viewing transform for mapping that portal to another, target hull;

a processor for traversing the data structure according to a selected viewpoint and selecting for rendering hulls and portals visible from that viewpoint;

pixel data generating means for generating pixel data from the data held in the data structure for each of the visible hulls and portals, thereby to render those hulls and portals in sequence in such a manner that, when a portal is encountered, the target hull is rendered according to the viewing transform associated with that portal.

For a better understanding of the present invention and to show how the same may be carried into effect, reference will now be made by way of example to the accompanying drawings in which.

Figure 1:
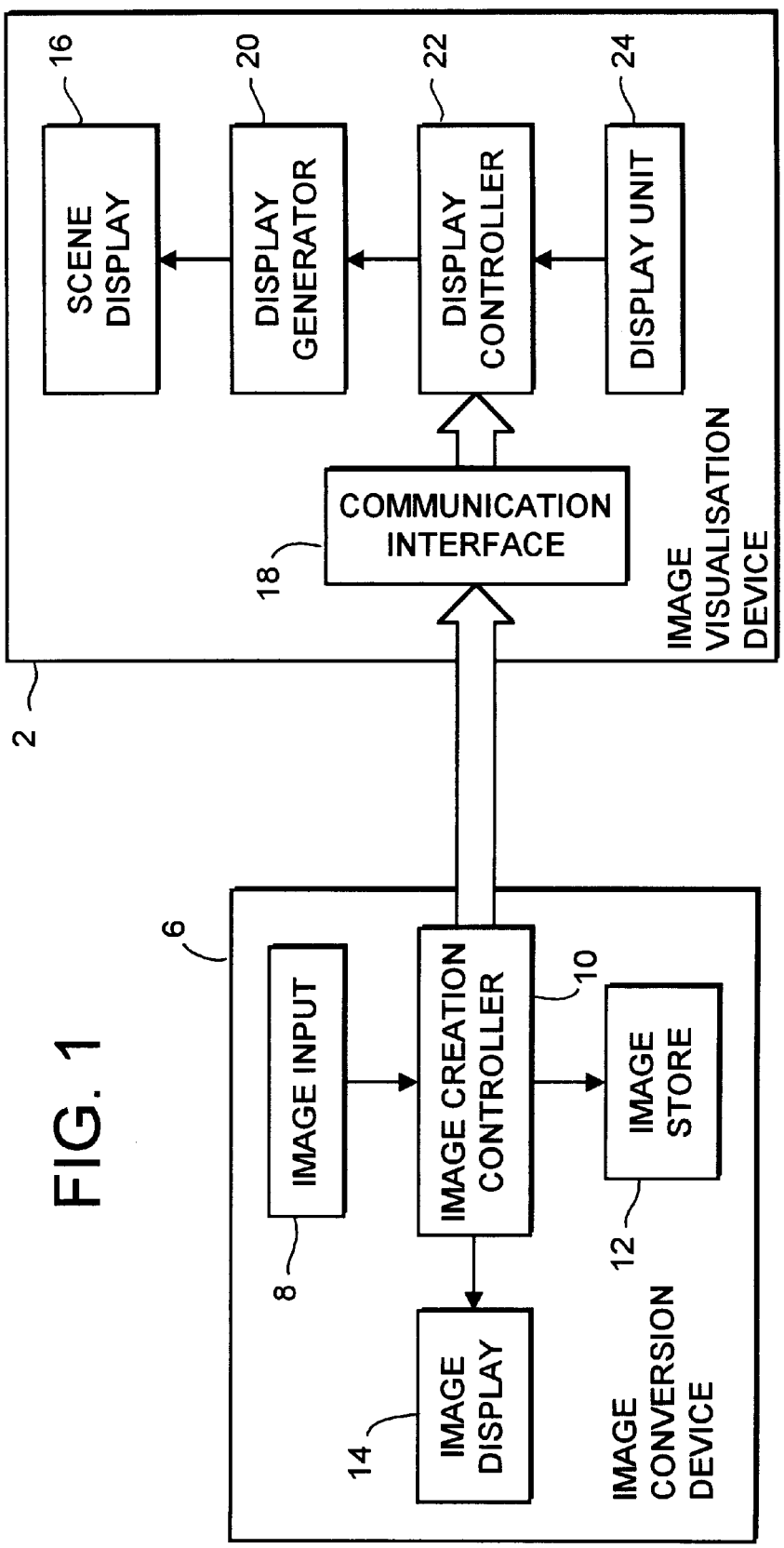
FIG. 1 is a schematic block diagram of one environment in which the present invention can be used.

FIG. 1 shows an exemplification of an image visualisation device 2 which is connected to receive compressed information via communications link 4 from an image generation device 6. The image generation device 6 may be remote from the image visualisation device 2, or they may in fact be the same device. In the event that they are the same device, they can be considered as two devices being separated in time, in that the image generation device 6 must first generate an image before it can be displayed on the image visualisation device 2. The image need only be generated once, no matter how many times thereafter it needs to be visualised.

The image generator 6 comprises an image creation controller 10 which receives inputs from an image input 8. The image creation controller 10 outputs signals to an image display 14, and an image store 12. The image store 12 generates signals on the communication link 4.

The image visualisation device 2 includes a communication interface 18 for receiving the compressed information on the communication link 4 and transferring such to a display controller 22. The display controller 22 receives inputs from a display input 24, and generates outputs to a display generating means 20. The display generating means 20 outputs signals to a scene display 16. The image generation device 6 is typically a computer system, the image input 8 comprising a keyboard and the image display 14 comprising a monitor. The image creation controller 10 comprises the processor circuitry of the computer system, and the image store 12 storage means in the computer system such as memory.

The image visualisation device 2 may similarly be a computer system, and in one embodiment the same computer system as the image generation device 6, or may alternatively be an application specific block provided simply for the purpose of displaying the compressed information. The display input 24 of the image visualisation device 2 may be any kind of input means such as a keyboard, a mouse, or a joystick. The display controller 22 may be processor circuitry of a computer system, or dedicated processor circuitry associated with the application specific to the image visualisation device 2. The display generation means 20 is a pixel generating means, which generates pixels to the scene display 16 in dependence on data provided thereto by the display controller 22. The scene display 16 is a monitor.

The compressed information may be provided to image visualisation device 2 from a number of sources. For instance, the communication link 4 may provide the compressed information from a memory store such as a CD-ROM, the compressed information having been written to the CD-ROM by the image generation device 6.

The image generation device 6 is responsible for generating compressed information in the form of compressed image data from a three dimensional image source. This can be considered as comprising of two main phases: creation of a scene; and interpretation of a scene.

Figure 2:
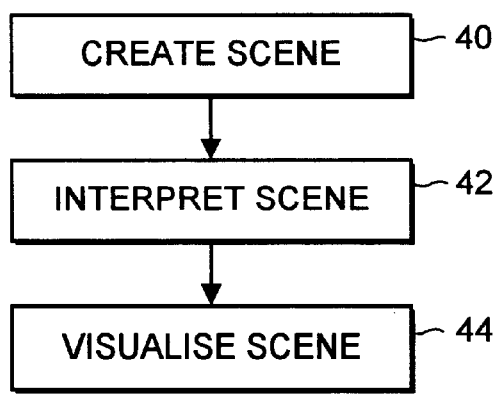
FIG. 2 illustrates a flow diagram of the general steps for implementing the hulls and portals system.

The mechanisms for implementing a hulls and portals system can be broken into three distinct stages. Hereinafter, these three stages will be described individually, with some examples and explanations of the terms and techniques used at each stage. Referring to FIG. 2, there is shown a flow chart illustrating the three distinct phases. The first stage 40 is to create a scene, the second stage 42 is to interpret the scene, and the third stage 44 is to visualise the scene. The stages of creating a scene and interpreting a scene are performed in the image generation device 6, and results in the generation of the compressed information. The first stage of visualising a scene is performed in the image visualisation device 2 based on the compressed information generated by the image generation device 6.

In one example, the image generation device 6 comprising a computer system employs a standard three dimensional (3-D) editing package such that a user can create, via the image input 8, 3-D scenes. In one particular application, a 3-D editing package known as "3-D Studio Max" is used. This enables a scene to be created having rooms and doorways/windows which link the rooms, together with objects in the rooms.

Figure 3:
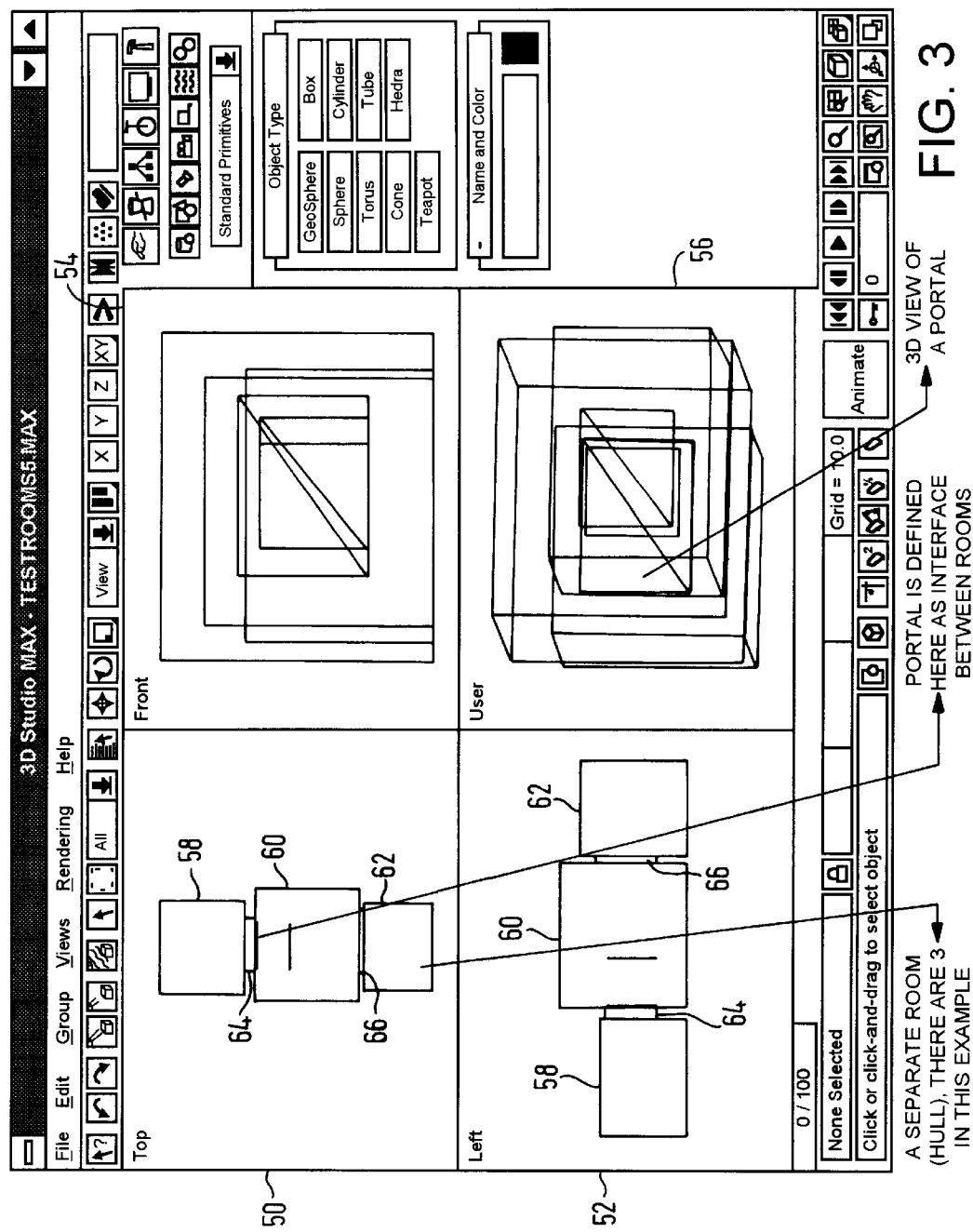
FIG. 3 illustrates the creation of a three dimensional scene using a 3-D Studio Max editor.

Referring to FIG. 3, there is illustrated one exemplification of the image display 14 whilst the 3-D Studio Max package is in use for generating a 3-D scene. In this particular example, a scene is being created having three rooms, the three rooms being interlinked by two doorways.

FIG. 3 shows a top view 50, left-side view 52, a front view 54, and a user (three dimensional) view 56 as seen on the image display 14 by the individual creating a 3-D scene using the image input 8. The scene comprises a first room 58, a second room 60 and a third room 62. The first room 58 and second room 60 are linked via a first doorway 64, and the second room 60 and third room 62 are linked by a second doorway 66. Thus, in this example, the first, second and third rooms are designated as first, second and third "hulls", and the first and second doorways are designated as first and second "portals".

A hull is merely a collection of "objects". An empty room comprises walls, a floor and a ceiling. Thus defining a set of walls, a floor and a ceiling as objects and associating them with a hull name defines that hull. Portals are doorways or windows from one hull to another hull. Thus a portal in one hull must generally be associated with a portal in another hull, but in a special case may be a "mirror" portal providing a doorway or window back into the same hull.

For the purpose of further description of the invention, the scenes will be considered in two dimensions only. The simplified two dimensional form can be easily extended into three dimensional form, and readily enables understanding of the present invention.

Figure 4:
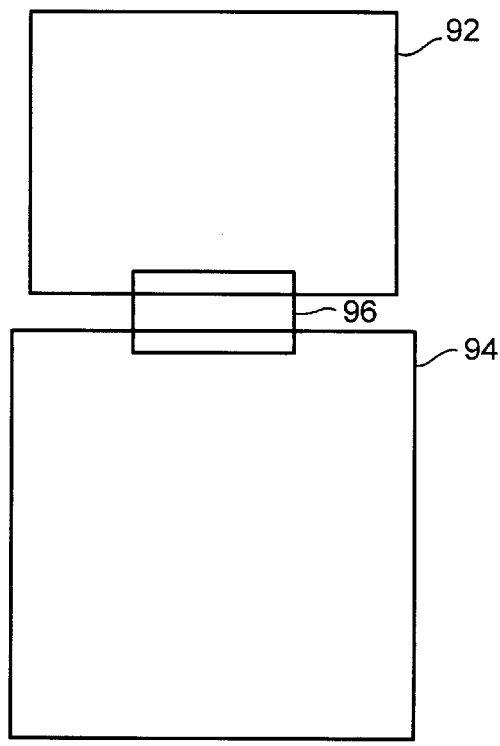
FIG. 4 illustrates in two dimensional form a simple geometrically correct scene.
Figure 5:
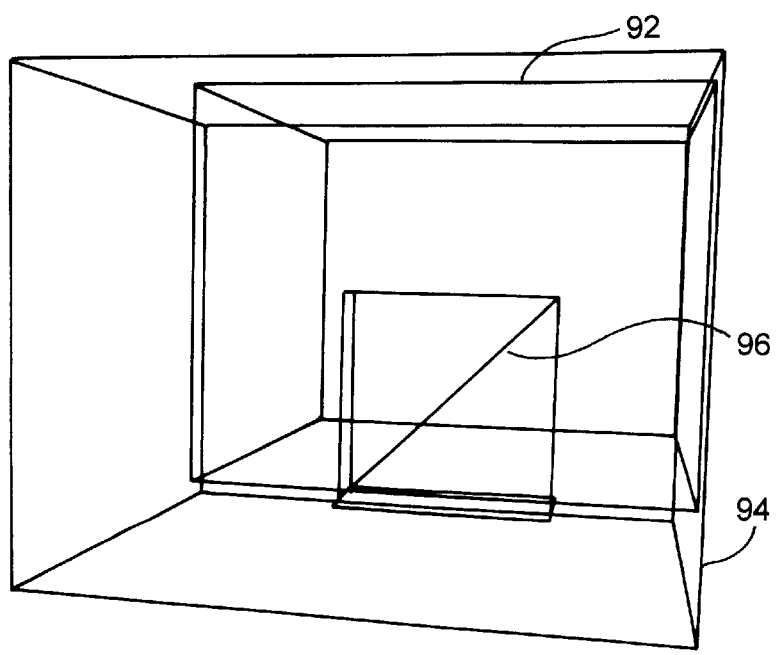
FIG. 5 illustrates in three dimensional form the simple scene of FIG. 4.

Referring to FIG. 4, there is illustrated a scene comprising a first room 92, a second room 94, and having a doorway or window 96 between the first and second rooms. The first and second rooms are designated as first and second hulls, and the doorway is designated as a portal. For completeness, FIG. 5 shows the two-dimensional example of FIG. 4 in its three-dimensional form.

Hulls are given an arbitrary name. Thus in relation to FIG. 4 we can name the first hull 92 HULL#1 and the second hull 94 HULL#2. In real examples, each of the first and second hulls may comprise objects therein, in the illustrated examples the only objects contained in a hull are the walls, floor and ceiling. Any object belonging to a hull is defined as:

objectname[hull name]

Thus, if there are two nominal objects in the first hull, they can be designated as OBJECT#1 [HULL#1] and OBJECT#2 [HULL#1]. Thus, any number of objects can be designated as belonging to a given hull.

Figure 6:
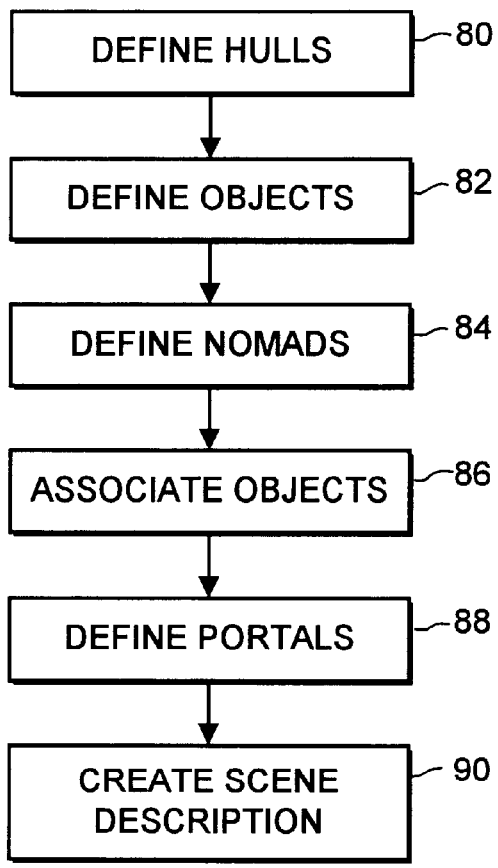
FIG. 6 illustrates the flow diagram for the steps of creating a scene.

FIG. 6 illustrates a general flow chart for carrying out the steps of creating a scene. A first step 80 is to define any hulls in the scene. Thus, in the present example, two hulls are defined as HULL#1 and HULL#2. A second step 82 is to define any objects. Thus in the present example we have defined two objects OBJECT#1 and OBJECT#2.

A third step 84 is to define nomads. Nomads are a special case of objects in that they are moving objects. A nomad is actually defined as a hull, and to distinguish from "normal" fixed hulls they are also referred to a sub-hulls. Nomads are simply objects that can move independently of the hulls. They are defined as objects, but are not statically associated with any hull.

In a next step 86, the defined objects are associated with respective defined hulls. Thus OBJECT#1 and OBJECT#2 are defined as associated with HULL#1.

A next step 88 is to define any portals in a scene. In the present example described with reference to FIG. 4, a portals 96 needs to be defined. There are several ways in which a portal can be defined, and two ways in which such definition can be made are described hereinbelow with reference to FIG. 4 and also FIG. 7.

Figure 7:
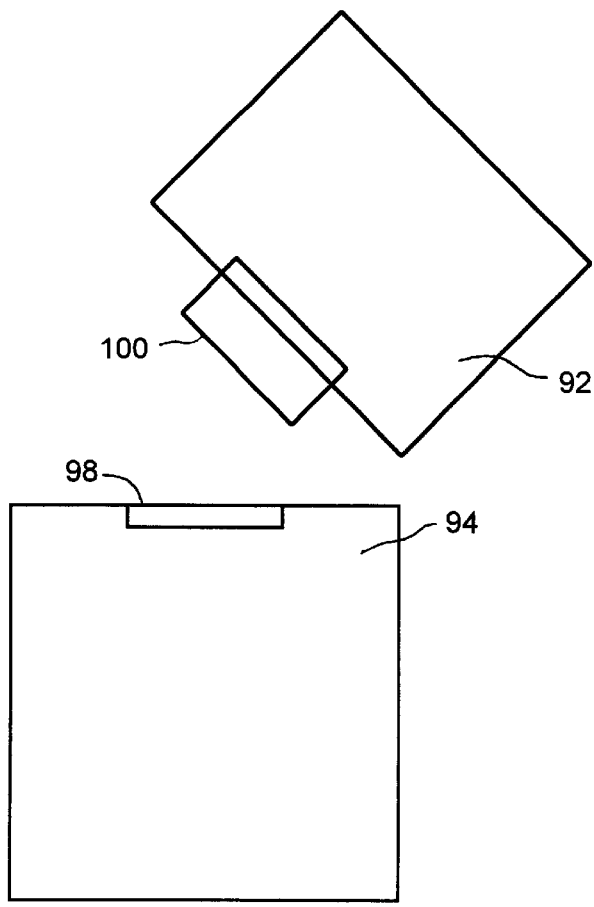
FIG. 7 illustrates a simple scene in a geometrically incorrect arrangement.

All objects are defined as a set of triangular polygons. Thus an object is made up of a plurality of triangular polygons. Each triangular polygon is defined by three coordinates. Thus, for example, if an object is of a rectangular shape, such rectangular shape is actually drawn by drawing two triangles. Thus in defining objects, a number of three coordinate polygons are listed which make up the shape of the object. In addition in defining the shape of objects, other information associated with the objects is also defined. For instance, the brightness of the objects in dependence on whether they are orientated towards a light source, texture coordinates associated with the objects etc. For a more detailed discussion of the various information defined in defining objects, reference should be made to the simple examples for creating the scenes of FIGS. 4 and 7 given at the end of this description with reference to Appendices A to J.

Portals are defined as four sided polygons by reference to four coordinates. As with objects, other information associated with the portals is defined.

Referring to FIG. 4 the arrangement shown therein is called a "geometrically correct" arrangement of connected hulls. In this geometrically correct arrangement, both the first 92 and second 94 hulls share a common coordinate system. That is, the first and second hulls 92 and 94 are both defined in the same coordinate system, and the portal 96 between the two hulls can be defined in this coordinate system such that if the portal 96 is defined in relation to the first hull 92 it will have the same coordinates as when it is defined in relation to the second hull 94.

The portal 96 shown in FIG. 4 is known as a "gap portal". The portal 96 can be defined as a single four sided polygon that references two hulls. The naming convention for defining gap portals is as follows:

portalname[hull1name]<->[hull2name]

This portal is defined in this way in relation to both of the first and second hulls. Thus, and referring to FIG. 4, the portal shown therein may be defined as:

portal#1[hull#1]<->[hull#2]

A second arrangement of hulls is known as a "geometrically incorrect" arrangement and is shown in FIG. 7. It is so called because since the first 92 and second 94 hulls are defined in different, independent coordinate systems. Referring to FIG. 7, the first hull 92 has a portal 100 associated therewith, and the second hull 94 has a portal 98 associated therewith. When the scene is created, the portals 98 and 100 are intended to be merged such that the scene is seen as an arrangement similar to that of FIG. 5. Thus this geometrically incorrect arrangement requires each of the portals 98 and 100 to be mapped onto each other to enable the scene to be created. Each portal belongs to a particular hull, and is defined as a four sided polygon. Each portal belonging to a particular hull must also reference a target hull and a portal in that target hull to enable the scene to be created. Thus, there is provided a mapping between two unconnected portals, and the portals in this arrangement are termed "mapping portals".

The naming convention for mapping portals is:

portalname[hullname]->targetportalname[targethullname]

There are two of these definitions for a mapping portal, one associated with each hull. Thus in the definition of the first hull 92 there will include a definition of a mapping portal being portal#1[hull#1]->portal#1[hull#2]. In the definition of the second hull there will be a definition of a mapping portal of portal#1[hull#2]->portal#1[hull#1]. Thus, the step 88 of defining the portals will take one of two routes in dependence on whether the portals between hulls are in a geometrically correct or geometrically incorrect system.

It should be noted that under software control gap portals could be converted to mapping portals. This allows the coordinate system for each hull in a geometrically correct arrangement to be altered such that they become independent, even if joined by gap portals.

Referring to FIG. 5 again, the next step 90 in creating a scene description by creating an editor file. The editor file assembles together for any particular scene the appropriate hulls, portals and nomads associated with the scene. This editor file effectively describes the geometry of the hulls, portals and nomads as described hereinabove. An overall description file is also established which contains a graph linking all the hulls, portals and nomads in the editor file according to their definition in the 3-D editor.

At this stage, any inconsistencies in the design of the scene can be picked up. For example, hulls that cannot be reached, references to non-existent hulls, etc. Furthermore, polygon properties such as animated textures, colours, and polygon normals can be inserted into the files at this stage.

Once the 3-D editor, in this case 3-D Studio Max, has been used to create the editor file and the overall description file that defines the connection graph, they must be parsed into a suitable format for real time visualisation. This primarily involves taking the hulls, portals and nomads, and the overall description file, parsing them and physically creating the graph described in the overall description file and linking hulls together via portals by creating the relevant transforms to achieve this. A flow chart illustrating the steps involved in interpreting the scene is illustrated in FIG. 8.

Figure 8:
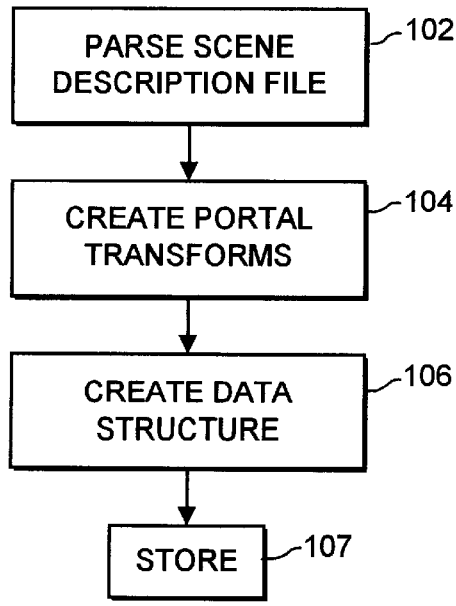
FIG. 8 illustrates a flow diagram of the steps for interpreting the scene.

As shown in FIG. 8, in interpreting a scene a first step 102 parses the scene description (editor files and overall description file), a second step 104 creates portal transforms, and a third step 106 creates data structures. These steps will now all be described in detail hereinafter. The interpretation process results in a data structure which is used to contain the collections of polygons that represent objects in the scene, and the position and geometry (i.e. sub-hull) of any nomad in the scene. The data structure thus created is stored in the image store 12 of the image generation device 6.

Figure 9:
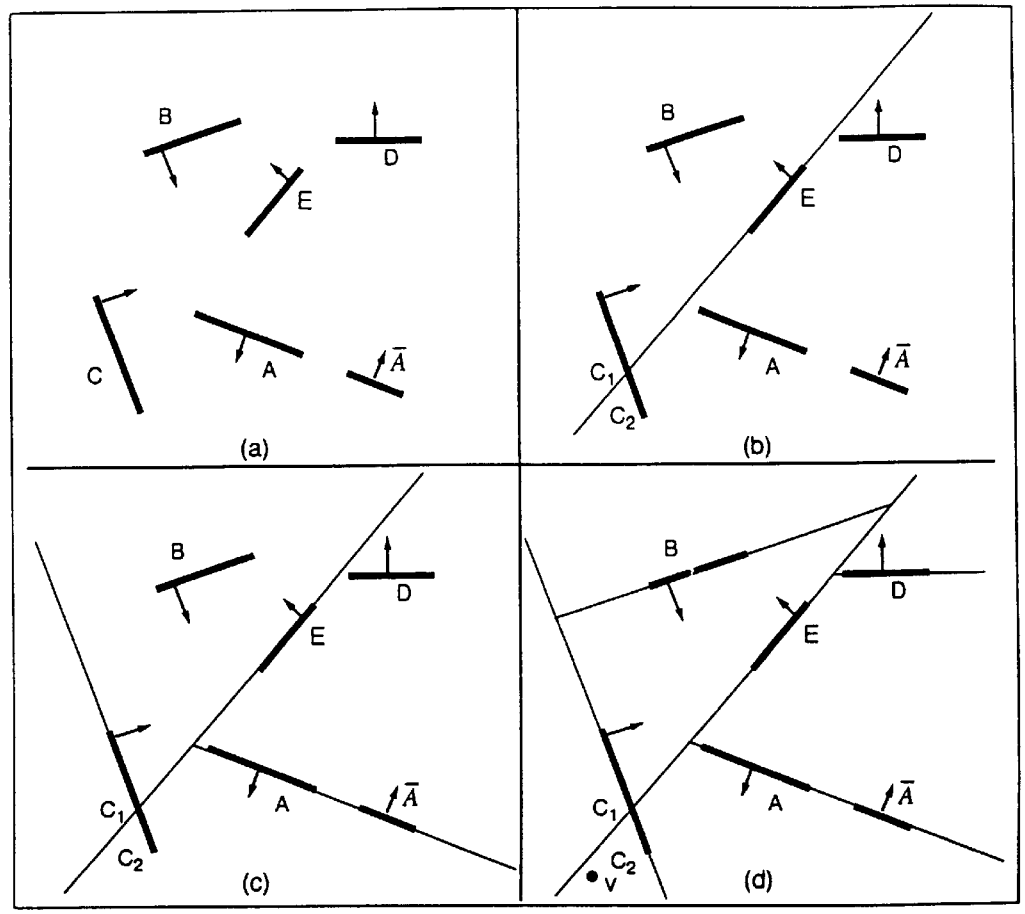
FIG. 9 illustrates the division of a scene to create a BSP tree.
Figure 10:
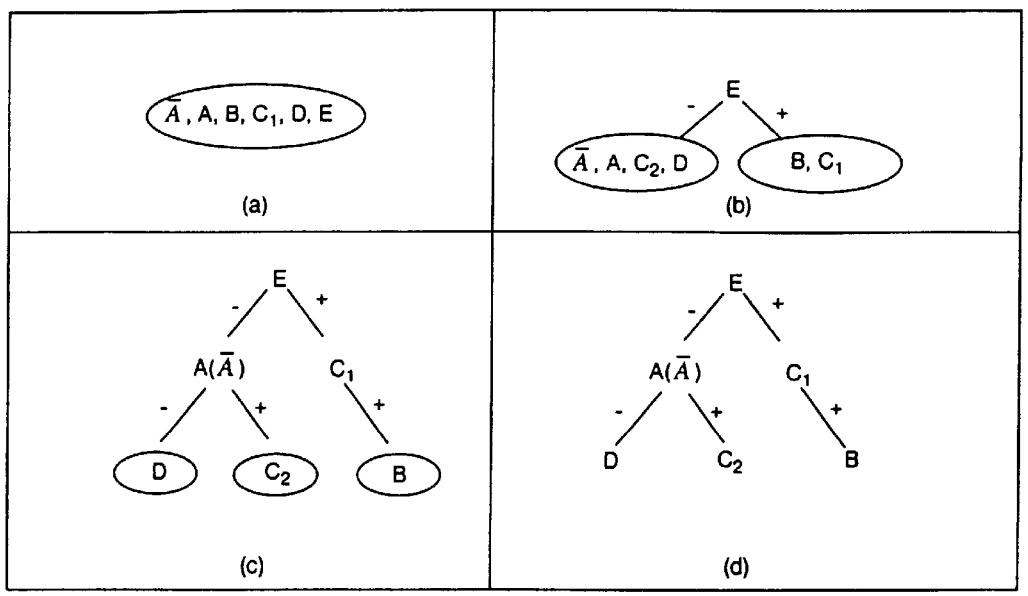
FIG. 10 illustrates the construction of a BSP tree for the scene of FIG. 9.

When visualising a three dimensional scene, some form of data structure is used to contain the collections of polygons that represent the objects in the scene. Precisely what form this data structure takes depends on the mechanism employed to remove hidden surfaces. Hidden surfaces are surfaces and/or parts of objects that are either outside the viewer's field of view, or are obscured by other objects nearer to the viewer. In the described embodiment, the polygons are contained in a tree structure known as a binary space partition (BSP) tree. This can order the polygons in the scene in such a way as to make it possible to draw them in a given order depending on the viewpoint, that will ensure that the polygons that are nearest the viewer are drawn last. Hence polygons that should be obscured in a scene are drawn before the polygons actually obscuring them, and overdrawn thereby. With reference now to FIGS. 9 and 10, the construction of a BSP tree to form the data structure as used in the present invention will be described.

Referring to FIG. 9a there is shown a scene containing five objects: A,$\overline{A}$,B,C,D and E. Each object has a face direction denoted by an arrow extending perpendicular from the object. In the first step of creating the data structure, the scene shown in FIG. 9a is sub-divided by selecting an arbitrary object in the scene and drawing a line in the plane thereof. Thus, referring to FIG. 9b, a line is drawn in the plane of object E sub-dividing the scene into two halves.

Referring to FIG. 10, there is shown the construction of the BSP tree at various stages. Initially the BSP tree consists of a list together of all of the objects shown in the scene of FIG. 9a, as shown in FIG. 10a. After dividing the scene in the plane of object E as shown in FIG. 9b, an initial part of the BSP tree has been formed as shown in FIG. 10, with the object E at the top of the tree, and the tree having two branches from object E; a negative branch and a positive branch. As can be seen in FIG. 9b, the drawing of a line in the plane of object E intersects object C such that two parts of object C are created, which in FIG. 9b are denoted as $C_1$ and $C_2$. Referring to FIG. 9b, it is seen that the object B and the object $C_1$ are on the side of the line drawn in the plane of object E which object E is facing. Therefore objects B and $C_1$ are considered to be on the positive side of object E. Conversely object $C_1$, A, D and $\overline{A}$ are on the opposite side of object E to the direction that E is facing, and can be considered as being on the negative side of object E. Thus FIG. 10b shows that the BSP three branches in a negative direction to objects A, $\overline{A}$, $C_2$ and D, and in a positive direction to objects B and $C_1$.

As shown in FIG. 9c, two further lines are drawn in the scene, one in the plane of object C and one in the plane of object A, both to intersect with the line in the plane of object E. In the same way as described hereinbefore, this further splits up the scene such that object B is on the positive side of object $C_1$, no objects being on the negative side of $C_1$. Object D is on the negative side of A. Object E does need to be considered since it forms a part of a higher level of the BSP tree, and specifically the root of the tree. Object $C_2$ is on the positive side of object A. Thus, referring to FIG. 10c, the BSP tree structure can be further enhanced.

Finally, and referring to FIG. 9d, additional lines are drawn through the planes of objects B and D. There are no objects on the negative side of B, and all objects on the positive side of B have already been accounted for in the BSP tree. There are no objects on the positive side of D, and all objects on the negative side of D have already been accounted for in the BSP tree. Thus, the BSP tree is complete.

Reference is now further made to FIG. 9d, wherein a viewpoint V is identified. Given a selected viewpoint V, and the BSP tree of FIG. 10, it is possible to determine how the polygons should be drawn on the display in order to ensure that they are drawn in the correct order. The plane of object E is at the root of the BSP tree of FIG. 10, it is first determined whether viewpoint V is on the positive side or the negative side of the plane of object E. The viewpoint V is on the negative side of the plane of E, and therefore the positive side of the tree is traversed from E to C1. Again, as V is on the negative side of the plane of C1 the tree is traversed down the positive side thereof to object B. There are no further branches after object B, therefore this is the first polygon to be drawn. Traversing back up the tree, C1 is the next node and as there are no negative polygons C1 is drawn and the tree is traversed back to the root E, E being the next object drawn. The negative side of the tree is then traversed to reach object A. Viewpoint V is in the positive side of the A plane, and therefore the negative side of the tree is traversed down to object D, object D drawn, and then the tree traversed back up to A which is then drawn. The tree is then traversed back to C2 which is drawn, and that completes the reconstruction of the scene. Thus, the BSP tree is used to enable the scene to be drawn in the order B, C1, E, D, A, C2.

$\overline{A}$ is never entered into the list because it faces the wrong way. Had the view direction been on the negative side of the A plane, then A would not have been listed and $\overline{A}$ would.

The ordering is independent of the direction of the viewpoint. Thus, if the viewpoint V was pointing away from all the polygons, then they would still be put out as rendering candidates in the order mentioned, but the reliance would be on the rest of the graphics pipeline to clip them out of the eventual view.

Portals are inserted into the chosen data structure representing the scene, and are effectively treated as object polygons themselves. In other words, a doorway (portal) into another room (hull) is treated as a polygon and is drawn in the correct order for the containing room. When it is nominated for drawing by the system (whether it is using a BSP tree structure or some other mechanism), the hull through the portal is rendered fully, before continuing to draw the rest of the objects (polygons) for the original hull.

Referring to FIG. 8, the step 104 of creating portal transforms is relevant only to mapping portals as described hereinabove. As described earlier, each mapping portal is defined in association with a viewing transform that defines mapping between respective hulls.

Figure 11:
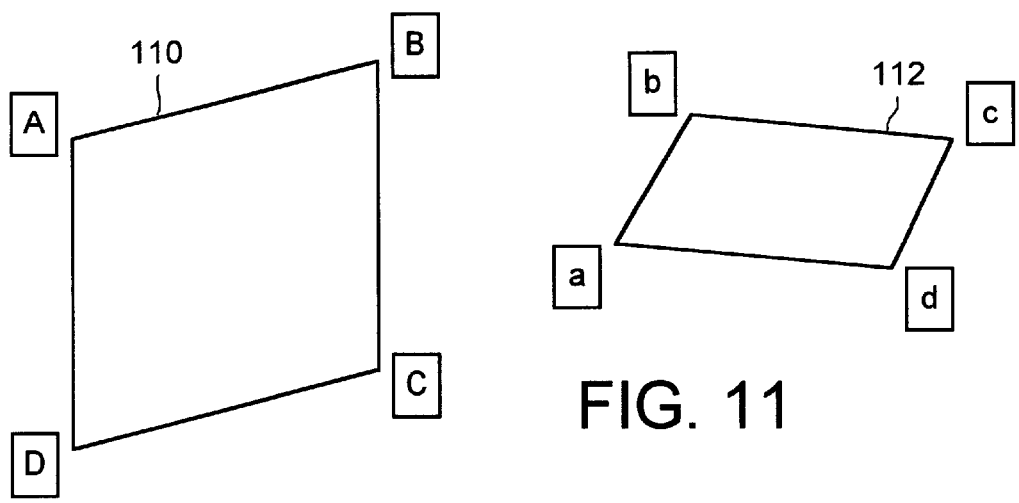
FIG. 11 illustrates the transformation of mapping portals.

Referring to FIG. 11 consider two portals 110 and 112 defined in association with two respective hulls (not shown) defined in their own coordinate systems. Portal 110 has four coordinates A,B,C,D defining a polygon and portal 112 has four coordinates a,b,c,d defining a polygon.

The polygon needs to be defined such that A maps to a, B maps to b, C maps to c and D maps to d. This mapping is handled by the mechanism employed during the creation of portals. The preferable procedure is to create one portal, copy it, rotate through 180 degrees, scale and move to the desired destination. In this way, the definition of the coordinates maps correctly when the portal is exported ready for the next stage of the process.

Now that the two coordinate system are defined (this can be done since each portal defines a plane, and a normal can be determined due to the ordering of the points), a transformation to move from one coordinate system to the other can be created in step 104 of FIG. 8. An example of the creation of the transformation for FIG. 11 follows.

Given the definition of the two portals by coordinate sets {A,B,C,D} and {a,b,c,d}, the following basis vectors for their respective coordinate spaces can be defined.

Basis set {U,V,W} where U is the unit vector along the direction of AB, V is the unit vector along the direction of AD and W is the normal to these two vectors created from the created from the cross product of U and V (that is AB×AD).

Basis set {u,v,w} created similarly from {a,b,c,d}.

The transformation from one space to another (say from {U,V,W} to {u,v,w}) is then defined by MO where MO=Inv(L)N where L is the matrix created from the U,V,W basis set, and N the matrix created from the u,v,w basis set.

Since U,V and W are unit vectors, Inv(L) is in fact Transpose(L).

Thus MO is in fact Transpose(L)N.

Taking into account any translation, a 4×4 homogeneous transformation from one coordinate space to another can be created. The translation in question can be calculated by comparing the absolute positions of two equivalent points in the two portals (say A and a).

The difference is then converted into a 4×4 transpose matrix r, and the results composed to form the full transformation M (where M=rMO).

The process can be repeated to form the transformation from coordinate space {u,v,w} to {U,V,W}, or the inverse transformation can be defined from the one already calculated.

Once all the portal transforms have been defined as described, and the portals inserted in the correct place in the containing hulls data structures, they are ready to be interpreted in a real time visualisation system. The thus created data structures, transforms, editor files, and overall description file are then stored in the image store 12 of the image generation device 6 as indicated by step 107 in FIG. 8.

The compressed information is retrieved from the image store 12 and transferred to the image visualisation device 2 via communications link 4. At the image visualisation device 2, a visualisation of the scene in real time takes place. The definition of the original image in terms of hulls and portals allows this stage to be made as fast as possible by traversing each scene, including passage through portals, in a simple fashion. A short description of the processes involved in rendering a scene to the scene display 16 follows.

Figure 12:
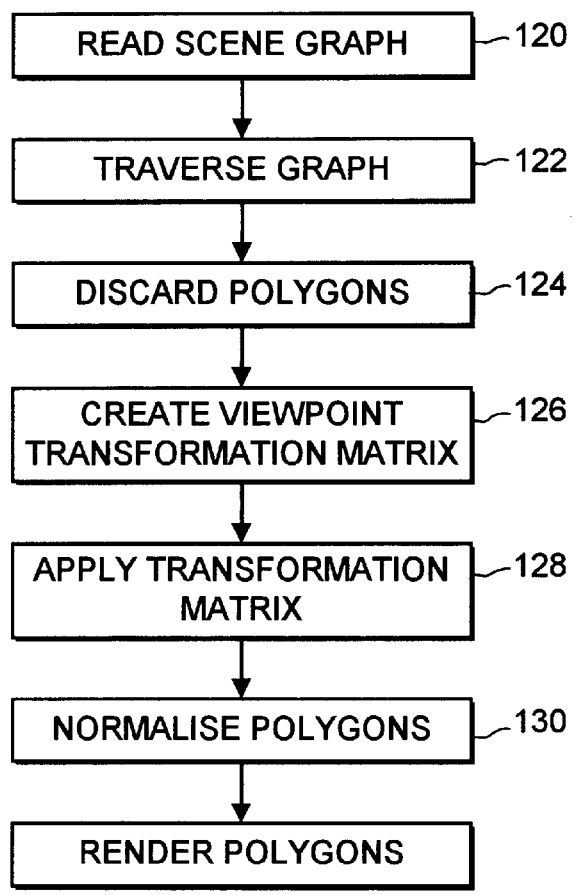
FIG. 12 is a flow diagram for the steps in rendering a scene.

The data structure constituting the compressed information on communication link 4 is received at the communication interface 18 and read into the display controller 22 within the image visualisation device 2. Referring to FIG. 12, there are illustrated the steps performed by the image visualisation device 2 in rendering the image to the scene display 16.

The initial scene graph is read into the image visualisation device 2 in step 120. The data structure is traversed according to a defined user viewpoint. As discussed hereinabove, this involves traversing the BSP tree. Initially, the viewpoint may be provided by default by the scene graph. However, a user may alter the viewpoint using the display input 24, and thus the graph is traversed in dependence on the viewpoint whether it is determined by an initial setup or by user interaction.

As discussed hereinabove, polygons are discarded if they are facing away from the viewpoint. In addition, polygons are discarded if they are outside the field of view for the viewpoint, as will be discussed in further detail hereinbelow.

The subset of polygons that remain are then transformed to the coordinate space of the viewpoint in step 126. This is a standard technique in graphics and basically involves creating a transformation matrix that moves the viewpoint to the origin, and includes a scaling factor based upon the distance from the viewpoint (perspective correction), such that objects that are further away from the viewpoint appear smaller. This matrix is then applied to all the polygons (objects) in the scene.

In the next step 128, the polygons are normalised to screen space. This usually simply involves scaling the coordinate system to a nominated viewport (for instance 0 to 640 in the x-axis and 0 to 480 in the y-axis). The polygons are then ready to be drawn in a two dimensional screen buffer, namely the display generating means 20 of the image visualisation device 2.

The above-described steps for image rendering represent known technology, except that the received data structure has a novel format in its definition of hulls and portals as described hereinabove with relation to the steps 40 and 42 of creating and interpreting a scene. There is, however, now a significant difference in the generation of pixel data from the polygons as a result of the definition of hulls and portals. This distinction arises in step 122 when the data structure is traversed. Some of the polygons in the scene graph actually represent portals into other hulls (for instance doorways into an adjacent room). When a polygon portal is encountered, the transformation associated with the portal is applied to the viewing transformation described above, so that the hull associated with the portal is then drawn using this new viewing transform. This process can be recursive, simply composing more and more viewing transforms to the basic transform as the hull-portal data structure is traversed.

Care should be taken that cycles do not occur. This can be done either by preventing traversal of the same hull twice, or by placing an upper limit on the number of hulls that can be traversed. The advantage of the second option is that facing mirrors can be implemented.

The introduction of portals means that extra culling techniques can be imposed to reduce the number of unnecessary polygons that are drawn. Many polygons will be completely obscured, but still drawn by the renderer since it cannot know that they are overdrawn by nearer polygons. By using hulls and portals, extra clipping can be performed to reduce this. The simplest of these techniques is called frustum culling.

Figure 13:
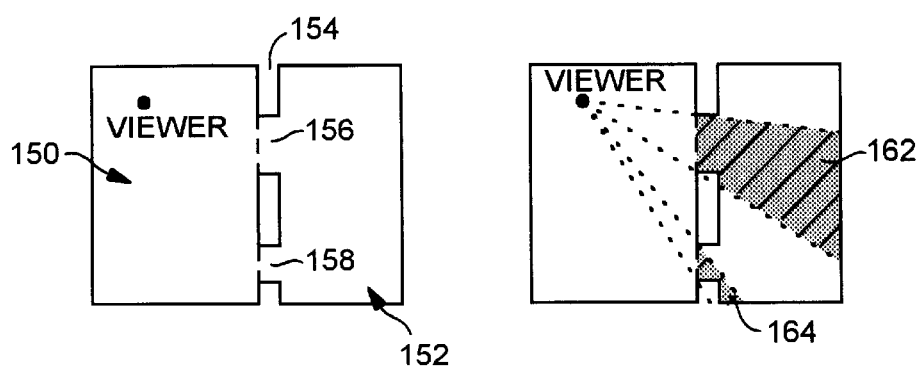
FIG. 13 illustrates the concept of frustum culling.

The concept of frustum culling using hulls and portals will now be described first with reference to FIG. 13. FIG. 13a shows a scene comprising a first hull 150 and a second hull 152 separated by a wall 154. Portals 156 and 158 provide "windows" between the first and second hulls. A viewer is at a point 160 in the first hull 150. The scenario shown in FIG. 13a is a common scenario found in many graphics implementations. The viewer at the point 160 in hull 1 looks into hull 2 through the portals 156 and 158. Referring to FIG. 13b it can be seen that when the viewer looks into hull 2 it sees two frustums 162 and 164 defined by the viewer's field of view into the second hull.

Thus the scene is rendered in the normal way by the image visualisation device 2 using the BSP tree as described hereinabove. However, when the portals are due to be rendered, the adjoining hull is drawn instead. That is, when the portals 156 and 158 are to be drawn, rather than drawing those portals the second hull 152 is drawn. The second hull is drawn by calculating a viewing frustum relative to the portals 156 and 158 and the viewer at point 160, and projecting them into the same hull. This means that a small subset of the second hull 152 is rendered instead of all of it. Therefore the subsets 162 and 164 are rendered, and not the whole of the hull 152.

Figure 14:
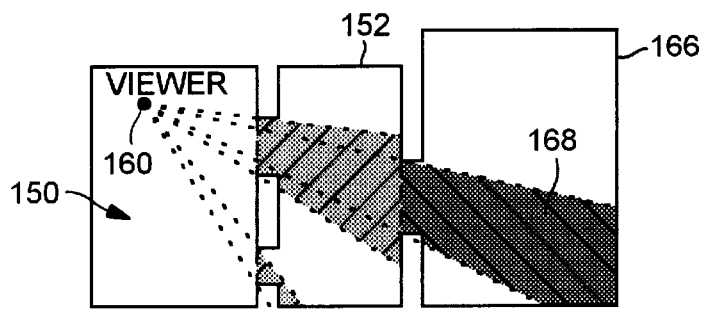
FIG. 14 illustrates further the concept of frustum culling.

A second common scenario is illustrated in FIG. 14. This is an extension of the scenario of FIG. 13. In the scenario of FIG. 14, a third hull 166 is visible from the first hull 150 through the second hull 152. This scenario can be resolved by the following steps:

trace a frustum through the portal being considered;
if the frustum intersects another portal, then determine the intersection points; and
when rendering the hull, when the portal is signalled as a candidate for rendering, trace a new frustum from those points into the next hull.

In order to effect this algorithm, a proper frustum polygon intersection function needs to be added to determine if a portal actually has intersected a frustum. Thus, referring to FIG. 14, it can be seen that the frustum 162 intersects with the portal 170 of the third hull 166. The intersection points of the frustum 162 with the portal 170 are defined by the extremities of the portal 170. When rendering the hull, when the portal 170 is signalled as a candidate for rendering, a new frustum is traced from this intersection, i.e. the extremities of the portal 170 in the case of FIG. 14, into the next hull. This new frustum is indicated as frustum 168 in the hull 166 in FIG. 14.

Figure 15:
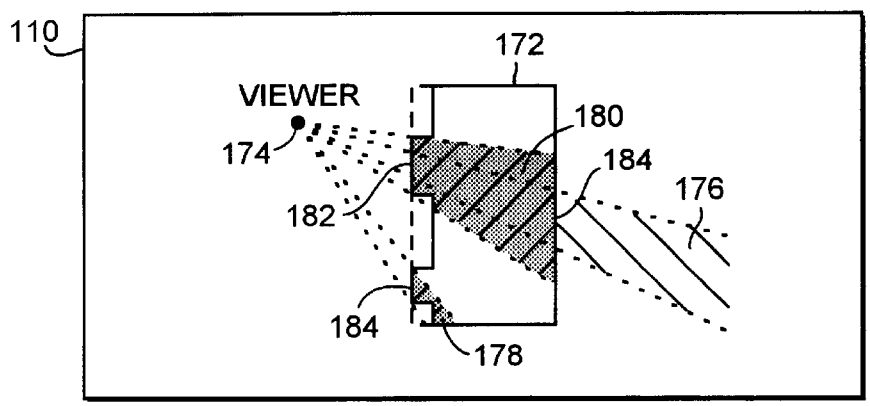
FIG. 15 illustrates a special case scene of a hull within a hull.

Referring to FIG. 15, a third scenario is illustrated: a hull within a hull. This scenario is useful for several situations, considered a city-scape, with buildings, each with a series of rooms. The buildings themselves are hulls, each containing a series of rooms which are also hulls. This means that the rooms can each be encapsulated as a hull with portals leading between them.

Referring to FIG. 15 there is shown a first hull 170 and a second hull 172 wholly contained within the first hull 170. A viewer at the point 174 within the first hull 170 is looking into the second hull 172 through portals 182 and 184, the respective viewing frustums being 180 and 178 in the second hull 172. The second hull 172 additionally has a "candidate" portal which leads back to the first hull 170. Following the rules laid out in the second scenario described above, the tertiary hull, i.e. the first hull 170, would normally be rendered. However, in this case rendering of a "tertiary" hull through the candidate portal 184 can be stopped very easily by enforcing a check to ensure that the candidate hull has not already been rendered. This is done simply by allocating each hull a unique key, which is a check when a portal intersection is detected.

Figure 16:
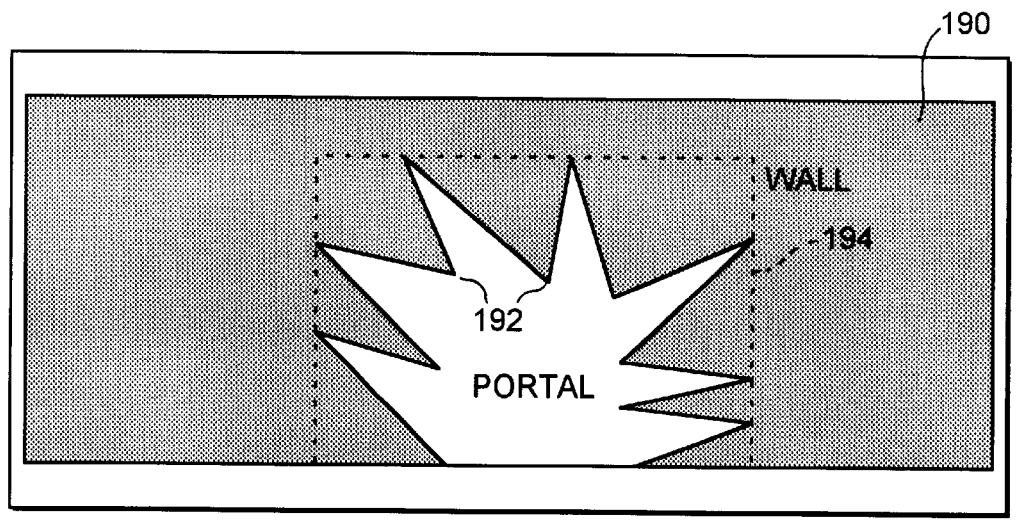
FIG. 16 illustrates a special case of an irregular shaped portal.

As has been described hereinabove, each portal is defined as a four sided polygon having four coplanar coordinates. However, this does not exclude the possibility of having irregular shaped portals. Referring to FIG. 16, there is shown a wall 190 having an irregular shaped portal 192 therein. Such a portal shape is achieved by ensuring that for any BSP node, the portals objects are drawn first. Thus, referring to FIG. 16, a portal 194 is first drawn. A frustum can then be generated and projected as described herein above, and a secondary hull rendered, and then the irregular shapes 192 of the hull drawn on top over the portal. This imposes the constraint that the wall containing a portal must be ordered very carefully. The portal must be rendered before any of the surrounding wall. This could be ensured in one of two ways:

i) careful construction of the BSP tree to make sure that the portal is drawn first; or ii) position the portal behind the wall so that it is always drawn first since it is physically behind the wall.

This would prevent further complication of the BSP tree construction.

One of the main problems for a BSP based system is that of moving objects. In order to be correct, any object moving in a scene must be re-merged with the BSP tree, cutting polygons according to all the candidate planes in the BSP tree. The use of portals simplifies this process greatly. It is not onerous to insert a single polygon into a BSP tree, particularly if a "centroid" based approach is used since sub-division does not occur and the polygon can be filtered down the tree very quickly. If this polygon is a portal, then instead of drawing a polygon the hull that is linked to the portal can be traversed, and a sub-tree inserted into the scene. The "centroid" approach means identifying the central point of a moving object (i.e. a nomad), and using the only central point to identify the location of the object when rendering the scene.

Nomads (or moving hulls) are themselves BSP tree "hulls". They are inserted into the BSP tree using a single central point, the "centroid" approach described hereinabove. The single central point is put in at a leaf the BSP tree that already exists. Referring back to FIG. 10 (d) the single central point could be inserted beneath any of D, $C_2$ or B on the positive or negative side thereof, or on the negative side of $C_1$. The central point will have a transform associated therewith to map the portal associated with the nomad, which in turn maps to the sub-hull of the nomad.

Figure 17:
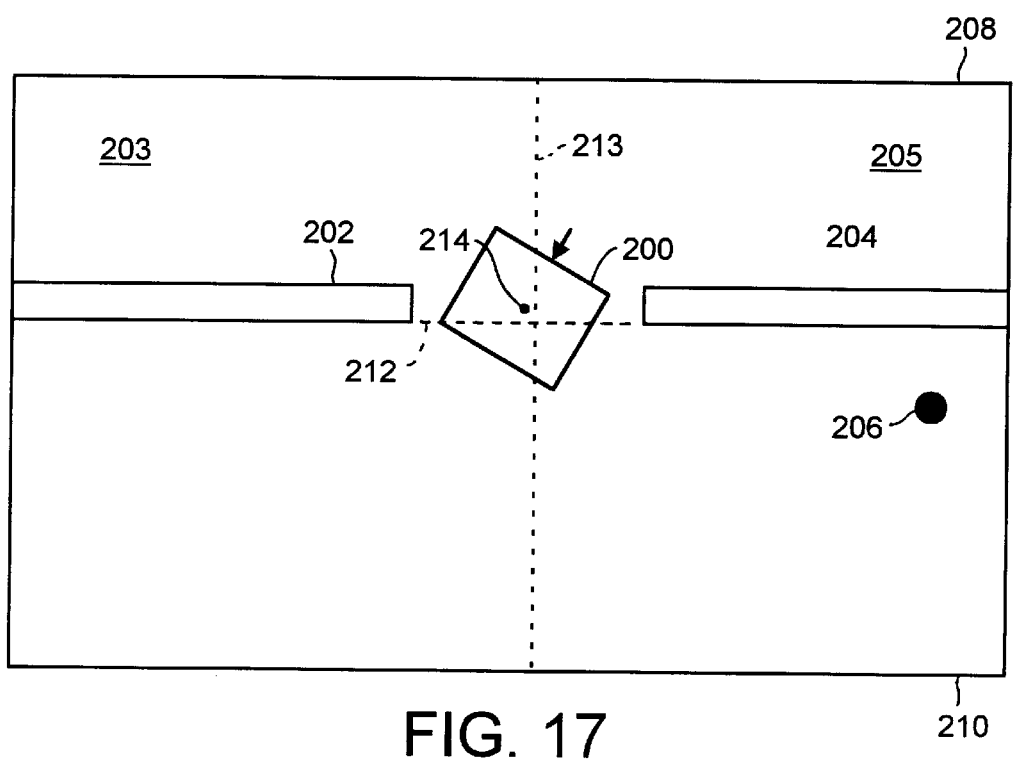
FIG. 17 illustrates the special case of a moving object traversing between hulls.

This centroid approach means there is scope for error since occlusions may be incorrect for parts of the model. Consider the scenario illustrated in FIG. 17. This illustrates how it can be possible to insert an object into a BSP tree and then view it in such a way as to be rendered in the incorrect order. FIG. 17 shows a nomad 200 moving from a portion of a first hull 208 into a portion of a second hull 210. The nomad 200 is moving through a portal 212, defining a doorway, which creates two sections of a wall 202 and 204. The viewpoint is a point 206 in the second hull 210.

The centroid 214 of the nomad 200 is clearly on the other side of the portal 212 from the viewpoint 206. This means that when the image is rendered the whole of the nomad 200 will be drawn before any of the wall. Clearly, in order to render the image correctly from the viewpoint 206, the wall 202 should be drawn prior to the nomad 200, and then the wall 204 drawn.

The solution to this problem is to create a half space clip plane 213. The half space clip plane 213 is a plane arbitrarily drawn through the plane of the portal 212 and in the portal space, which splits the two walls 202 and 204 into two spaces 203 and 205. Ideally but not necessarily, the half space clip plane 213 is perpendicular to the plane of the portal 212 and splits the portal into two halves. This artificial plane is added when the 3-D model is created. The drawing of the clip plane 213 results in the portal 212 being associated with one of the halves 203 or 205. The clip plane 213 may be drawn, therefore, in line with the edges of the portal 212. In FIG. 17, the artificial plane 213 associates the portal 212 with the space 203. Thus the nomad 200 is in the space 203.

The problem of rendering the image in the correct order is then solved by not ignoring any intersections with potential half clip planes. By checking the bounding sphere of a given nomad whilst inserting it into a BSP tree, it is possible to determine when a potential problem arises. A bounding sphere of a nomad is a sphere drawn around the object completely encompassing such using the centroid of the object as the central point of the sphere.

In FIG. 17, it can be seen that the bounding sphere of the nomad 200 intrudes into the clip plane of both of the walls 202 and 204. Once this intrusion has been determined, it is possible to calculate within each of the two half spaces 203 or 205 whether the nomad or the respective wall 202 or 204 is closer to the viewpoint 206. In the example shown, the half space 203 will be drawn before the half space 250 because it is further away from the viewpoint 206. Within the half space 203, the wall 202 is drawn before the nomad 200 because it is further away from the view point. As a general case, each time a nomad moves, intrusion into the clip plane of any object is tested for.

In the example described above, the creation and interpretation of the scene are carried out at the image generator and are performed initially and once only. Once a scene is ready for visualisation it can be visualised as many times as is necessary in the image rendering device. For a typical application, this will be every time a new frame is generated. For real time visualisation systems, this can be of the order of 30 frames per second. While in the described example, portals are created at the image generator, it is also possible to create portals dynamically by using the user interface in the image rendering device, together with the necessary viewing transforms.

Two simple specific examples will now be described for creating a simple data structure and editor files for storing in the image store 12 of the image generation device.

A first simple case is described with reference to the scene shown in FIG. 4 comprising two hulls in a common coordinate system and a single gap portal. A second simple case is described with reference to the scene shown in FIG. 7 comprising two hulls in independent coordinate systems, each having a respective mapping portal. As has been described hereinabove, when recreated the scene for both these simple examples looks like the scene shown in FIG. 5.

Referring to the first simple example of FIG. 4, the two hulls 92 and 94 are joined by a single portal 96. These are modelled in the 3-D editor as being geometrically correct, i.e. the hulls are modelled connected as shown in FIG. 4. Individual hulls and portals are designated by naming the separate objects within the scene according to a defined grammar, as discussed hereinabove. The two hulls 92 and 94 are named arbitrarily as "room1" and "room2" respectively. The portal 96 is named simply as "doorway". The objects to be defined in the hulls are, in this simple example, merely the walls. Thus the names of the objects in this scene are:

walls[room1]

walls[room2]

doorway[room1]<->[room2]

To understand how this labelling works, it can be seen that the first hull consists of objects named walls belonging to the hull named room1. Similarly the second hull consists of objects named walls belonging to the hull named room2. The portal linking these two hulls together is an object named doorway linking hulls named room1 and room2.

It can be seen from this description that hulls themselves are not objects, but rather a hull is defined by the objects it contains. For instance the hull could be defined as floor, ceiling and walls each named as floor[room1], ceiling [room1], walls[room1]. In the simple case presented herein, the only objects given for any hull are the walls, which are taken to implicitly include the ceiling and floor.

Referring now to the second simple example of FIG. 7, the two hulls 92 and 94 are modelled in the 3-D editor as being geometrically incorrect, i.e. the hulls are modelled independently and are not physically joined. Each hull has a mapping portal associated therewith, and to ensure recreation of a scene as shown in FIG. 5 each portal of each hull must be mapped onto the other. When a scene is ultimately rendered to a viewer it will be similar to the scene of FIG. 5.

Using the 3-D Studio Max editor to create the 3-D scenes, as in the present simple example, the names that can be given to objects must follow a stricter convention. This allows the exporter to determine what hulls various objects belong to, etc. The quick grammar is defined as follows:

nomad:=name hullconstituent:=name[name]

mappingportal:=name[name]→name[name]

gapportal:=name[name]<->[name]

Appendix A includes a definition of terms of the grammar. The raw output that is created by the exporter for the example of FIG. 4 is shown in Appendix B. Appendix B shows the first file of this raw output, known as a "fit" file (fundamental interconnectedness of all things). The first section of this file is the hull list, which lists the hulls that the environment contains. The next section lists the nomads ("sub-hulls"), and in this particular environment there are no nomads. The next section lists the portals. In this simple example only a single gap portal is defined with links rooms 1 and 2 through the portal called "doorway". The "clip" and "mirror" fields are set zero to indicate that the portal is not to be clipped and is not a mirror.

The final section defines start points. In this case there is one start point defined in room1.

Each hull, nomad and portal has an associated file that defines them. The file defining room1 is shown in Appendix C. The description file of Appendix C is based on virtual reality modelling language (VRML) version 1.0. This format has been modified to allow for extra features such as better texturing definition. Note that anything following a hash symbol is a comment and has no semantic relevance. Each of the sections of the description file of Appendix C are identified and discussed in Appendix D. The associated file defining room2 will be very similar to Appendix C. Appendix E shows the associated file for the doorway. This file defines the coordinates representing the portal. It is defined in the same coordinate system as the parent hull. It is again in the same format as the hull file. Once the doorway is defined in this way, the intermediate level file definition for this simple case is complete.

Appendix F shows the fit file for the second simple example of FIG. 7. This is identical to the previous example shown in Appendix B, except for the portal section. In this case there are two mapping portal files. Appendix G shows the two portal files created.

The final part of the process is to pass these intermediate files into a binary file which represents the BSP tree structure used by the real time renderer, which also includes information to link the portals and hulls. The process of creating the BSP tree data is two-folded. Firstly the binary format BSP tree files are compiled from the intermediate level files. Secondly these files are used in the real time renderer. In the following description these two stages are combined.

Returning to the simple case of FIG. 4, the portal in this section is a gap portal, and therefore the resulting matrix that is created as part of the portal is simply the identity matrix. This identity matrix is incorporated into the BSP tree that is created from the files. The output from the compilation stage of the BSP tree creation is given and annotated in Appendix H.

Figure 18:
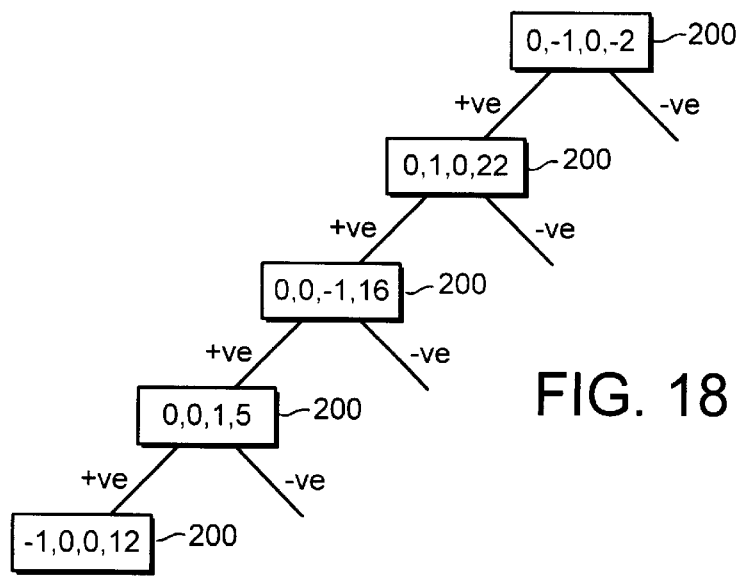
FIG. 18 illustrates the construction of a BSP tree for the specific example of FIG. 4.
Figure 19:
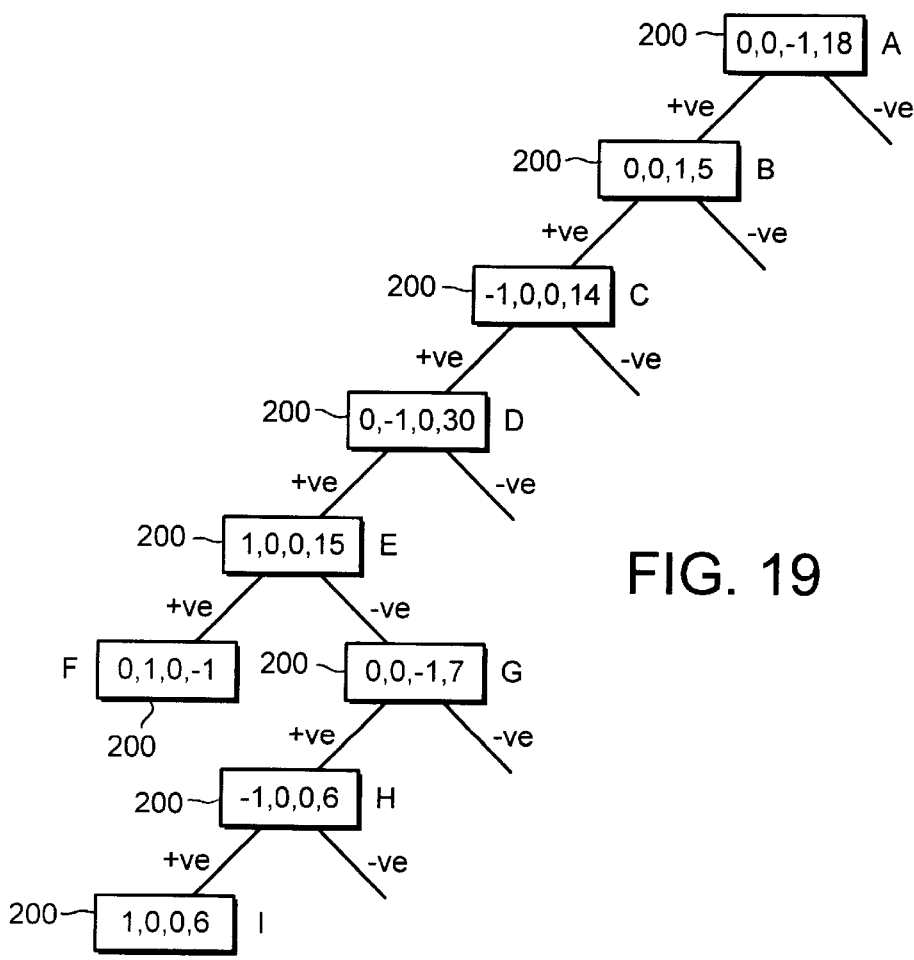
FIG. 19 illustrates the construction of a BSP tree for the specific example of FIG. 4.

FIG. 18 shows an illustration of the two BSP trees created in Appendix H. The boxes 200 represent the nodes in the list, and the numbers in the boxes represent the plane equation of each node. The tree in FIG. 18 is for room 2. A tree for room 1 is given in FIG. 19. As can be seen, the structures of both FIGS. 18 and 19 is linear, i.e. there is not a great deal of branching in the structure. This is because of the nature of the chosen objects: two cuboid rooms linked with a single portal. If the structure was less regular and square, then there would be a lot more branching.

Figure 20:
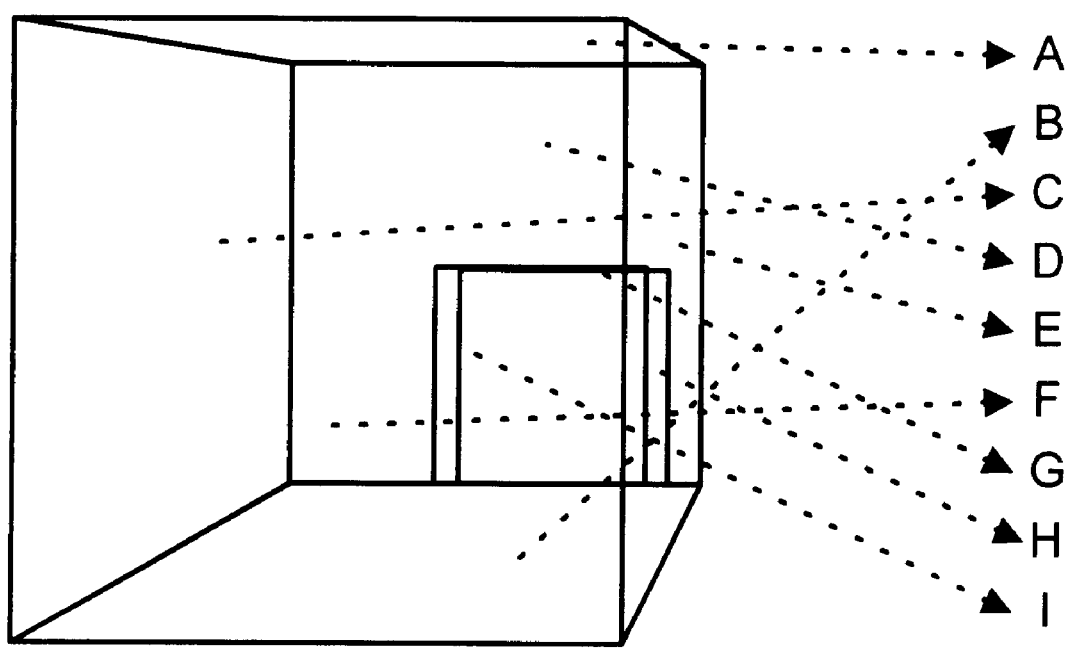
FIG. 20 illustrates the order in which the three-dimensional scene of FIG. 4 is drawn.

FIG. 20 illustrates how the second BSP tree of FIG. 19, relating to room 1, corresponding to an actual three-dimensional model. A to I is the order in which the objects are drawn determined by the BSP tree of FIG. 19. Essentially, the order is (from A to I): ceiling, floor, left wall, back wall, right wall, front wall, top of porch, right of porch, left of porch.

The portal that is in the porch linking the two BSP trees together is in itself a node in the BSP trees. It will have a plane equation of the form [0, −1,0,n]. This is not shown in the raw output from the compiler. It is inserted as the first node, and all other nodes in the tree will be in its positive sub-tree in this case.

Shown in Appendix I, is the traversal of the tree and rendering of the polygons contained within it.

Appendix J illustrates the case for the simple example of FIG. 7. The two BSP trees will look very similar to the BSP trees of FIGS. 18 and 19. However, the portal that is defined in each of the BSP trees is significantly different. It is represented in Appendix J.

APPENDIX A

Subhulls

To mark an object as a Subhull, it is given a basic name of the form "bob2", "Spinny_Thing" etc. This object is placed in a subhull file which has the same name as the object, suffixed with .shl. The object itself appears as the sole VRML Separator in the file, and has the same name as the object. The names of all subhulls within a model must be unique. Currently we have no scheme to deal with different instances of the same object.

HullConstituent

Assume we have a name structure of ObjName[HullName]. All objects which share the same HullName will be gathered together as one list of INodes, and will be output as a single file. This will be a VRML file called HullName.hul, and each object will be present as a VRML Separator called ObjName. Note that hulls are created implicitly whenever a new HullName is encountered, so that a typo will result in an object appearing in its own .hul file. Each Hull creates its own namespace, therefore names of objects in different hulls do not need to be unique - each Hull can have an object called Floor for instance. Each hull name must naturally be unique.

MappingPortal

All portals should be formed from single objects, and should consist of a single convex quadrilateral face. No two portals in a given scene should share a single PortalName; they must all be unique. There can be two different types of portals. The simplest is a mapping portal, which will have a name structure of PortalName[FromHull]->ToPortal[ToHull]. This defines a hull constituent object, PortalName[FromHull], which will be treated exactly like any other hull constituent, i.e. placed as a VRML Separator called PortalName in the file FromHull.hul. However, it also defines a one-way mapping to an object called ToPortal which lies in hull ToHull; this information is placed in the .fit master file, described later. For portals such as windows or doorways, a symmetric definition of the form ToPortal[ToHull]->PortalName[FromHull] would be expected in the other hull. Portals such as teleporters or TV screens will not have a symmetric definition. Mapping portal names and gap portal names must be unique.

GapPortal

In the case where a number of hulls have been created in one co-ordinate system, the mapping approach for portals does not work well. Say we have two rooms, and wish to define them as separate hulls with a portal in the doorway, to speed rendering. Using mapping portals, we would have to define two coincident objects, and give them different names, to map to each other. Instead, we use a gap portal, which defines a single object to be a portal between the two hulls. Say we have a name structure of PortalName[Hull1]<->[Hull2]; this defines that the object PortalName exists in both Hull1 and Hull2, and acts as an interface between them. Since the single object does not belong to one hull or the other, it is placed in neither; instead it gets its own portal file, PortalName.ptl, where it is the only Separator, in the same manner as a subhull.

StartPoint

This mechanism allows the designer to create scale properties and starting points in the model. It works in a similar way to the portals. The designer creates a 4 sided object orientated in the desired direction and scaled to represent the player. The system then scales the rest of the model to this scale, so when viewed, the model is the correct scale. It also uses the position of the start point as a potential start point for a player. Obviously, several start points can be created. If this is the case, then the designer must ensure that all the points are the same size, since scaling the environment will choose one of these start points to scale to in a non-deterministic manner. In order to create a start point, the character representation must be placed in a hull.

APPENDIX B

```
HullList [
 hullName "room2.hul"
 hullName "room1.hul"
]

SubhullList [
]

PortalList [
 GapPortal {
  portalName    "doorway"
  portalFilename "doorway.ptl"
  hull1      "room1"
  hull2      "room2"
  clip       0
  mirror     0
 }
]

StartList [
 StartPoint {
  startpointName  "tester.stp"
  hullName        "room1"
 }
]
```

Appendix C

Room1.hul

VRML V1.0 ascii

DEF Root Separator {

Info {
  string "Opened as <room1.hul> at <15:28:34> by the TGZ exporter"
}

MaterialBinding ( value PER_FACE_INDEXED )

Material { # default material
  ambientColor [ 0.2 0.2 0.2 ]
  diffuseColor [ 0.8 0.8 0.8 ]
  specularColor [ 0.0 0.0 0.0 ]
  shininess    [ 0.2 ]
  transparency [ 0.0 ]
}

DirectionalLight { # default light
  on TRUE
  intensity 0.8
  color    0.5 0.5 0.5
  direction 0.5773 0.5773 0.5773
}

DEF walls Separator { # originally "walls[room1]"

Material {
  ambientColor  [ 0.200000  0.350000  0.200000]
  diffuseColor  [ 0.400000  0.700000  0.400000]
  specularColor [ 0.900000  0.900000  0.900000]
  shininess     [ 0.400000 ]
  transparency  [ 0.000000 ]
  texturename   [ "tekId14.ppm" ]
}

Coordinate3 {
  point [ # (26 verts)
    -5.691926  -1.663171  -5.051455, # 0
     6.052056  -1.663171  -5.051455, # 1
    -1.312754  -1.663171  -5.051455, # 2
    -5.691926  -1.663171   2.251133, # 3
    -3.979736  -1.663171  -5.051455, # 4
     6.052056  -1.663171  -4.544937, # 5
    -5.691926  -1.663171   6.692527, # 6
     6.052056  -1.663171   6.692527, # 7
   -15.494820   1.092734  -5.051455, # 8
   -15.494820  30.452688  -5.051455, # 9
    13.865135  30.452688  -5.051455, # 10
   -15.494820   1.092734  18.436508, # 11
    13.865135   1.092734  18.436508, # 12
    13.865135  30.452688  18.436508, # 13
   -15.494820  30.452688  18.436508, # 14
    13.865135   1.092734  -5.051455, # 15
     6.052056   2.570137  -5.051455, # 16
     6.052056   1.092734  -5.051455, # 17
    -5.691926   2.570137  -5.051455, # 18
    -5.691926   1.764888  -5.051455, # 19
    -5.691926   1.092734  -5.051455, # 20
     3.097249   1.092734  -5.051455, # 21
     6.052056   1.092734   6.692527, # 22
     6.052056   1.092734   1.393858, # 23
    -5.691926   1.092734  -3.493497, # 24
    -5.691926   1.092734   6.692527, # 25
  ] # point
} # Coordinate3

Normal {
  vector [
    0.000000  0.000000  1.000000, # ( 0) face 0

```
0.000000   0.000000  -1.000000, # (  1) face 1
0.000000   0.000000  -1.000000, # (  2) face 2
-1.000000  0.000000   0.000000, # (  3) face 3
-1.000000  0.000000   0.000000, # (  4) face 4
0.000000  -1.000000   0.000000, # (  5) face 5
0.000000  -1.000000   0.000000, # (  6) face 6
1.000000   0.000000   0.000000, # (  7) face 7
1.000000   0.000000   0.000000, # (  8) face 8
0.000000   0.000000   1.000000, # (  9) face 9
0.000000   0.000000   1.000000, # ( 10) face 10
0.000000   1.000000   0.000000, # ( 11) face 11
0.000000   0.000000   1.000000, # ( 12) face 12
0.000000   0.000000   1.000000, # ( 13) face 13
0.000000   0.000000   1.000000, # ( 14) face 14
0.000000   0.000000   1.000000, # ( 15) face 15
0.000000   0.000000   1.000000, # ( 16) face 16
0.000000   0.000000   1.000000, # ( 17) face 17
0.000000   0.000000   1.000000, # ( 18) face 18
0.000000   0.000000   1.000000, # ( 19) face 19
0.000000   1.000000   0.000000, # ( 20) face 20
0.000000   1.000000   0.000000, # ( 21) face 21
0.000000   1.000000   0.000000, # ( 22) face 22
0.000000   1.000000   0.000000, # ( 23) face 23
0.000000   1.000000   0.000000, # ( 24) face 24
0.000000   1.000000   0.000000, # ( 25) face 25
0.000000   1.000000   0.000000, # ( 26) face 26
0.000000   0.000000   1.000000, # ( 27) face 27
-1.000000  0.000000   0.000000, # ( 28) face 28
0.000000   0.000000   1.000000, # ( 29) face 29
0.000000   0.000000   1.000000, # ( 30) face 30
1.000000   0.000000   0.000000, # ( 31) face 31
1.000000   0.000000   0.000000, # ( 32) face 32
0.000000   0.000000   1.000000, # ( 33) face 33
0.000000   0.000000   1.000000, # ( 34) face 34
-1.000000  0.000000   0.000000, # ( 35) face 35
-1.000000  0.000000   0.000000, # ( 36) face 36
1.000000   0.000000   0.000000, # ( 37) face 37
1.000000   0.000000   0.000000, # ( 38) face 38
0.000000   0.000000  -1.000000, # ( 39) face 39
0.000000   0.000000  -1.000000, # ( 40) face 40
-1.000000  0.000000   0.000000, # ( 41) face 41
0.000000   0.000000   1.000000, # ( 42) sg= 1024, mtl= 1 (v0/0)
1.000000   0.000000   0.000000, # ( 43) sg= 8192, mtl= 2 (v0/1)
-1.000000  0.000000   0.000000, # ( 44) sg= 4096, mtl= 3 (v1/0)
0.000000   0.000000   1.000000, # ( 45) sg= 1024, mtl= 1 (v1/1)
0.000000   0.000000   1.000000, # ( 46) sg= 1024, mtl= 1 (v2)
1.000000   0.000000   0.000000, # ( 47) sg= 8192, mtl= 2 (v3)
0.000000   0.000000   1.000000, # ( 48) sg= 1024, mtl= 1 (v4)
-1.000000  0.000000   0.000000, # ( 49) sg= 4096, mtl= 3 (v5)
1.000000   0.000000   0.000000, # ( 50) sg= 8192, mtl= 2 (v6/0)
0.000000   0.000000  -1.000000, # ( 51) sg= 2048, mtl= 0 (v6/1)
0.000000   0.000000  -1.000000, # ( 52) sg= 2048, mtl= 0 (v7/0)
-1.000000  0.000000   0.000000, # ( 53) sg= 4096, mtl= 3 (v7/1)
0.000000   0.000000   1.000000, # ( 54) sg= 32, mtl= 1 (v8/0)
1.000000   0.000000   0.000000, # ( 55) sg= 512, mtl= 2 (v8/1)
0.000000   1.000000   0.000000, # ( 56) sg= 256, mtl= 4 (v8/2)
0.000000   0.000000   1.000000, # ( 57) sg= 32, mtl= 1 (v9/0)
0.000000  -1.000000   0.000000, # ( 58) sg= 256, mtl= 5 (v9/1)
1.000000   0.000000   0.000000, # ( 59) sg= 512, mtl= 2 (v9/2)
0.000000   0.000000   1.000000, # ( 60) sg= 32, mtl= 1 (v10/0)
-1.000000  0.000000   0.000000, # ( 61) sg= 128, mtl= 3 (v10/1)
0.000000  -1.000000   0.000000, # ( 62) sg= 256, mtl= 5 (v10/2)
0.000000   0.000000  -1.000000, # ( 63) sg= 64, mtl= 0 (v11/0)
1.000000   0.000000   0.000000, # ( 64) sg= 512, mtl= 2 (v11/1)
0.000000   1.000000   0.000000, # ( 65) sg= 256, mtl= 4 (v11/2)
0.000000   0.000000  -1.000000, # ( 66) sg= 64, mtl= 0 (v12/0)
-1.000000  0.000000   0.000000, # ( 67) sg= 128, mtl= 3 (v12/1)
0.000000   1.000000   0.000000, # ( 68) sg= 256, mtl= 4 (v12/2)
0.000000   0.000000  -1.000000, # ( 69) sg= 64, mtl= 0 (v13/0)
-1.000000  0.000000   0.000000, # ( 70) sg= 128, mtl= 3 (v13/1)
0.000000  -1.000000   0.000000, # ( 71) sg= 256, mtl= 5 (v13/2)
0.000000   0.000000  -1.000000, # ( 72) sg= 64, mtl= 0 (v14/0)
0.000000  -1.000000   0.000000, # ( 73) sg= 256, mtl= 5 (v14/1)
1.000000   0.000000   0.000000, # ( 74) sg= 512, mtl= 2 (v14/2)
```

```
-1.000000   0.000000   0.000000, # ( 75) sg= 128, mtl=  3 (v15/0)
 0.000000   0.000000   1.000000, # ( 76) sg=  32, mtl=  1 (v15/1)
 0.000000   1.000000   0.000000, # ( 77) sg= 256, mtl=  4 (v15/2)
 0.000000   0.000000   1.000000, # ( 78) sg=  32, mtl=  1 (v16)
 0.000000   0.000000   1.000000, # ( 79) sg=  32, mtl=  1 (v17/0)
 0.000000   1.000000   0.000000, # ( 80) sg= 256, mtl=  4 (v17/1)
-1.000000   0.000000   0.000000, # ( 81) sg= 4096, mtl=  3 (v17/2)
 0.000000   1.000000   0.000000, # ( 82) sg= 1024, mtl=  1 (v17/3)
 0.000000   0.000000   1.000000, # ( 83) sg=  32, mtl=  1 (v18)
 0.000000   0.000000   1.000000, # ( 84) sg=  32, mtl=  1 (v19)
 0.000000   0.000000   1.000000, # ( 85) sg=  32, mtl=  1 (v20/0)
 0.000000   1.000000   0.000000, # ( 86) sg= 256, mtl=  4 (v20/1)
 0.000000   0.000000   1.000000, # ( 87) sg= 1024, mtl=  1 (v20/2)
 1.000000   0.000000   0.000000, # ( 88) sg= 8192, mtl=  2 (v20/3)
 0.000000   0.000000   1.000000, # ( 89) sg=  32, mtl=  1 (v21/0)
 0.000000   0.000000   1.000000, # ( 90) sg= 1024, mtl=  1 (v21/1)
 0.000000   1.000000   0.000000, # ( 91) sg= 256, mtl=  4 (v22/0)
-1.000000   0.000000   0.000000, # ( 92) sg= 4096, mtl=  3 (v22/1)
 0.000000   0.000000  -1.000000, # ( 93) sg= 2048, mtl=  0 (v22/2)
 0.000000   1.000000   0.000000, # ( 94) sg= 256, mtl=  4 (v23/0)
-1.000000   0.000000   0.000000, # ( 95) sg= 4096, mtl=  3 (v23/1)
 0.000000   1.000000   0.000000, # ( 96) sg= 256, mtl=  4 (v24/0)
 1.000000   0.000000   0.000000, # ( 97) sg= 8192, mtl=  2 (v24/1)
 0.000000   1.000000   0.000000, # ( 98) sg= 256, mtl=  4 (v25/0)
 1.000000   0.000000   0.000000, # ( 99) sg= 8192, mtl=  2 (v25/1)
 0.000000   0.000000  -1.000000, # (100) sg= 2048, mtl=  0 (v25/2)
} # vector
} # Normal TextureCoordinate2 {
point {
    3.330568    5.000000,
    5.000000    0.000000,
    2.504795    5.000000,
    5.000000    1.554538,
    3.038982    5.000000,
    5.000000    0.107825,
    3.330568    5.000000,
    5.000000    2.500000,
    5.000000    0.000000,
    0.000000    0.000000,
    0.000000    0.000001,
    5.000000    5.000000,
    0.000001    5.000000,
    0.000000    5.000000,
    0.000000    5.000000,
    0.000001    0.000000,
    1.330568    4.340932,
    1.330568    4.570943,
    3.330567    4.340932,
    3.330567    4.466298,
    4.570943    0.000000,
    1.833771    4.570943,
    4.570943    2.500000,
    4.570943    1.372046,
    4.570943    0.331850,
    3.330567    4.570943,
    4.999999    0.000000,
    5.000000    4.570943,
    0.000000    0.000001,
    0.000001    4.570944,
    5.000000    4.570943,
    0.000000    0.000001,
    4.999999    0.000000,
    0.000000    0.000001,
    5.000000    4.570943,
    0.000001    0.000000,
    4.570944    0.000000,
    0.000001    5.000000,
    4.570944    5.000000,
    0.000001    5.000000,
    4.570944    0.000000,
    4.999999    0.000000,
    0.000000    0.000000,
```

| | |
|---|---|
| 4.999999 | 5.000000, |
| 4.999999 | 5.000000, |
| 0.000000 | 0.000000, |
| 4.570943 | 0.000000, |
| 0.000000 | 0.000000, |
| 4.570943 | 5.000000, |
| 4.570943 | 5.000000, |
| 0.000001 | 4.570944, |
| 0.000000 | 0.000001, |
| 1.330568 | 4.340932, |
| 1.330568 | 4.570943, |
| 0.000001 | 4.570944, |
| 1.330568 | 4.340932, |
| 1.330568 | 0.000000, |
| 0.000001 | 5.000000, |
| 0.000000 | 0.000001, |
| 5.000000 | 4.570943, |
| 3.330567 | 4.340932, |
| 1.330568 | 4.340932, |
| 3.330567 | 4.340932, |
| 3.330567 | 4.466298, |
| 1.330568 | 4.340932, |
| 3.330567 | 4.340932, |
| 5.000000 | 4.570943, |
| 3.330567 | 4.466298, |
| 3.330567 | 4.466298, |
| 1.330568 | 4.570943, |
| 5.000000 | 4.570943, |
| 3.330567 | 4.570943, |
| 3.330567 | 4.466298, |
| 1.833771 | 4.570943, |
| 1.330568 | 4.570943, |
| 3.330567 | 4.466298, |
| 3.330567 | 4.570943, |
| 1.833771 | 4.570943, |
| 0.000001 | 5.000000, |
| 1.330568 | 2.500000, |
| 5.000000 | 5.000000, |
| 1.330568 | 1.372046, |
| 0.000001 | 5.000000, |
| 1.330568 | 0.000000, |
| 1.330568 | 1.372046, |
| 1.330568 | 2.500000, |
| 3.330567 | 0.000000, |
| 5.000000 | 0.000000, |
| 3.330567 | 0.331650, |
| 5.000000 | 0.000000, |
| 3.330567 | 2.500000, |
| 3.330567 | 0.331650, |
| 3.330567 | 2.500000, |
| 5.000000 | 5.000000, |
| 1.330568 | 2.500000, |
| 3.330567 | 2.500000, |
| 3.330567 | 4.570943, |
| 3.330568 | 5.000000, |
| 1.833771 | 4.570943, |
| 4.570943 | 0.000000, |
| 5.000000 | 0.000000, |
| 4.570943 | 1.372046, |
| 1.330568 | 4.570943, |
| 2.584795 | 5.000000, |
| 1.330568 | 5.000000, |
| 2.584795 | 5.000000, |
| 1.833771 | 4.570943, |
| 5.000000 | 0.000000, |
| 4.570943 | 0.000000, |
| 5.000000 | 1.554538, |
| 5.000000 | 1.554538, |
| 4.570943 | 0.331650, |
| 3.038982 | 5.000000, |
| 1.833771 | 4.570943, |
| 5.000000 | 0.107825, |
| 4.570943 | 2.500000, |
| 4.570943 | 1.372046, |

```
              5.000000   0.107825,
              6.000000   1.554536,
              4.570943   2.500000,
              4.570943   2.500000,
              6.000000   2.500000,
              3.330568   5.000000,
              1.330568   4.570943,
              1.330568   4.570943,
              1.330568   5.000000,
           ] # point
         ) # TextureCoordinate2

IndexedFaceSet ( coordIndex [
              9,    8,   10,   -1, # face 0  (sg 32, mat 1)
             12,   11,   13,   -1, # face 1  (sg 64, mat 0)
             14,   13,   11,   -1, # face 2  (sg 64, mat 0)
             10,   15,   13,   -1, # face 3  (sg 128, mat 3)
             12,   13,   15,   -1, # face 4  (sg 128, mat 3)
              9,   10,   14,   -1, # face 5  (sg 256, mat 5)
             13,   14,   10,   -1, # face 6  (sg 256, mat 5)
              8,    9,   11,   -1, # face 7  (sg 512, mat 2)
             14,   11,    9,   -1, # face 8  (sg 512, mat 2)
             15,   10,   16,   -1, # face 9  (sg 32, mat 1)
             17,   15,   16,   -1, # face 10 (sg 32, mat 1)
             15,   17,   12,   -1, # face 11 (sg 256, mat 4)
             10,    8,   18,   -1, # face 12 (sg 32, mat 1)
             16,   10,   18,   -1, # face 13 (sg 32, mat 1)
             19,   16,   18,   -1, # face 14 (sg 32, mat 1)
              8,   19,   18,   -1, # face 15 (sg 32, mat 1)
             16,   19,   17,   -1, # face 16 (sg 32, mat 1)
              8,   20,   19,   -1, # face 17 (sg 32, mat 1)
             21,   17,   19,   -1, # face 18 (sg 32, mat 1)
             20,   21,   19,   -1, # face 19 (sg 32, mat 1)
             12,   22,   11,   -1, # face 20 (sg 256, mat 4)
             23,   12,   17,   -1, # face 21 (sg 256, mat 4)
             23,   22,   12,   -1, # face 22 (sg 256, mat 4)
             20,    8,   24,   -1, # face 23 (sg 256, mat 4)
              8,   25,   24,   -1, # face 24 (sg 256, mat 4)
             25,    8,   11,   -1, # face 25 (sg 256, mat 4)
             11,   22,   25,   -1, # face 26 (sg 256, mat 4)
             20,    0,   21,   -1, # face 27 (sg 1024, mat 1)
             17,    1,   23,   -1, # face 28 (sg 4096, mat 3)
             17,    2,    1,   -1, # face 29 (sg 1024, mat 1)
              2,   17,   21,   -1, # face 30 (sg 1024, mat 1)
              0,   20,    3,   -1, # face 31 (sg 8192, mat 2)
              3,   20,   24,   -1, # face 32 (sg 8192, mat 2)
              4,   21,    0,   -1, # face 33 (sg 1024, mat 1)
             21,    4,    2,   -1, # face 34 (sg 1024, mat 1)
              5,   22,   23,   -1, # face 35 (sg 4096, mat 3)
              5,   23,    1,   -1, # face 36 (sg 4096, mat 3)
              3,   24,   25,   -1, # face 37 (sg 8192, mat 2)
             25,    6,    3,   -1, # face 38 (sg 8192, mat 2)
              6,   25,   22,   -1, # face 39 (sg 2048, mat 0)
             22,    7,    6,   -1, # face 40 (sg 2048, mat 0)
              7,   22,    5,   -1, # face 41 (sg 4096, mat 3)
           ] # coordIndex normalIndex [
             57,   54,   60,   -1, # face 0
             66,   63,   69,   -1, # face 1
             72,   69,   63,   -1, # face 2
             61,   75,   70,   -1, # face 3
             67,   70,   75,   -1, # face 4
             58,   62,   73,   -1, # face 5
             71,   73,   62,   -1, # face 6
             55,   59,   64,   -1, # face 7
             74,   64,   59,   -1, # face 8
             76,   60,   78,   -1, # face 9
             79,   76,   78,   -1, # face 10
             77,   80,   68,   -1, # face 11
             60,   54,   83,   -1, # face 12
             78,   60,   83,   -1, # face 13
```

```
    84,  78,  83,  -1, # face 14
    54,  84,  83,  -1, # face 15
    78,  84,  79,  -1, # face 16
    54,  85,  84,  -1, # face 17
    89,  79,  84,  -1, # face 18
    85,  89,  84,  -1, # face 19
    68,  91,  65,  -1, # face 20
    94,  68,  80,  -1, # face 21
    94,  91,  68,  -1, # face 22
    86,  56,  96,  -1, # face 23
    56,  98,  96,  -1, # face 24
    98,  56,  65,  -1, # face 25
    65,  91,  98,  -1, # face 26
    87,  42,  90,  -1, # face 27
    81,  44,  95,  -1, # face 28
    82,  45,  45,  -1, # face 29
    46,  82,  90,  -1, # face 30
    43,  88,  47,  -1, # face 31
    47,  88,  97,  -1, # face 32
    48,  90,  42,  -1, # face 33
    90,  48,  46,  -1, # face 34
    49,  92,  95,  -1, # face 35
    49,  95,  44,  -1, # face 36
    47,  97,  93,  -1, # face 37
    99,  50,  47,  -1, # face 38
    51, 100,  93,  -1, # face 39
    93,  52,  51,  -1, # face 40
    53,  92,  49,  -1, # face 41
] # normalIndex textureCoordIndex [
    26,  27,  28,  -1, # face 0
    29,  30,  31,  -1, # face 1
    32,  33,  34,  -1, # face 2
    35,  36,  37,  -1, # face 3
    38,  39,  40,  -1, # face 4
    41,  42,  43,  -1, # face 5
    13,  44,  45,  -1, # face 6
    46,  47,  48,  -1, # face 7
    14,  49,   9,  -1, # face 8
    50,  51,  52,  -1, # face 9
    53,  54,  55,  -1, # face 10
    15,  56,  57,  -1, # face 11
    58,  59,  60,  -1, # face 12
    61,  10,  62,  -1, # face 13
    63,  64,  65,  -1, # face 14
    66,  67,  18,  -1, # face 15
    16,  68,  69,  -1, # face 16
    70,  71,  72,  -1, # face 17
    73,  74,  75,  -1, # face 18
    76,  77,  19,  -1, # face 19
    78,  79,  80,  -1, # face 20
    81,  82,  83,  -1, # face 21
    84,  85,  12,  -1, # face 22
    86,  87,  88,  -1, # face 23
    89,  90,  91,  -1, # face 24
    92,   8,  93,  -1, # face 25
    11,  94,  95,  -1, # face 26
    96,  97,  98,  -1, # face 27
    99, 100, 101,  -1, # face 28
   102, 103, 104,  -1, # face 29
   105,  17, 106,  -1, # face 30
   107, 108, 109,  -1, # face 31
   110,  20, 111,  -1, # face 32
   112, 113,   0,  -1, # face 33
    21,   4,   2,  -1, # face 34
   114, 115, 116,  -1, # face 35
   117,  23,   1,  -1, # face 36
   118,  24, 119,  -1, # face 37
   120, 121,   3,  -1, # face 38
   122,  25, 123,  -1, # face 39
   124, 125,   6,  -1, # face 40
     7,  22,   5,  -1, # face 41
] # textureCoordIndex
```

```
    ) # IndexedFaceSet
    ) # Separator walls[room1]
    ) # Root Separator
# Closed at 15:28:35
```

Appendix D

Info, MaterialBinding

These are definition that are throwbacks to VRML 1.0 and are unimportant.

Material

This first material definition is the default material all polygons will assume if they have no other defined for them.

DirectionalLight

This is the default light defined in 3d studio. Others could have been defined if desired. This will effect how the polygons look. I.e. if they are oriented towards the light, then they will be brighter.

DEF Walls Separator

When the hull was originally defined in the editor, it was created as walls[room1]. This means that it was an object of walls belonging to hull room1. Here is the object walls defined within the file relating to hull room1.

Material

This is the material associated with the Walls object. Notice that it is contained within the walls object definition.

Coordinate3

This is a list of all the vertices in the wall object

Normal, TextureCoordinate2

Similarly, here are a list of normals and texture co-ordinates associated with the wall object.

IndexedFaceSet

This construct actually defines how the various co-ordinates, normals and texture co-ordinates are put together. It is an index into the Coordinate3, Normal and TextureCoordinate2 lists. So the first Coordinate3 will have an index of 0 and subsequent 1 and so on. Similarly for normals and TextureCoordinate2's.

CoordIndex, NormalIndex, TextureCoordIndex

Define a set of triangles by indexing the Coordinate3, Normal and TextureCoordinate2 lists. For instance, the first set of three indices in the CoordIndex, NormalIndex and TextureCoordIndex correspond to the first triangle in the defined set.

APPENDIX E

Doorway.ptl

This file defines the co-ordinates representing the portal. It is defined in the same co-ordinate system as the parent hull. It is again in the same format as the hull files, however, most of the information is superfluous.

```
#VRML V1.0 ascii

DEF Root Separator {

Info {
    string "Opened as <doorway.ptl> at <15:28:39> by the TGZ exporter"
  }

MaterialBinding { value PER_FACE_INDEXED }

Material { # default material
    ambientColor  [ 0.2 0.2 0.2 ]
    diffuseColor  [ 0.8 0.8 0.8 ]
    specularColor [ 0.0 0.0 0.0 ]
    shininess     [ 0.2 ]
    transparency  [ 0.0 ]
  }

DEF doorway Separator { # originally "doorway[room1]<->[room2]"

Material {
      ambientColor  [ 0.000000  0.000000  0.000000 ]
      diffuseColor  [ 0.000000  0.000000  0.000000 ]
      specularColor [ 0.900000  0.900000  0.900000 ]
      shininess     [ 0.400000 ]
      transparency  [ 0.000000 ]
    }

Coordinate3 {
      point [ # (4 verts)
        -6.692000  -1.662999  -5.051282, # 0
         6.051982  -1.662999  -5.051282, # 1
        -5.692000  -1.662999   6.692700, # 2
         6.051982  -1.662999   6.692700, # 3
      ] # point
    } # Coordinate3

Normal {
      vector [
        0.000000  -1.000000  0.000000, # ( 0) face 0
        0.000000  -1.000000  0.000000, # ( 1) face 1
        0.000000  -1.000000  0.000000, # ( 2) sg= 0, mt= 0 (v0)
        0.000000  -1.000000  0.000000, # ( 3) sg= 0, mt= 0 (v1)
        0.000000  -1.000000  0.000000, # ( 4) sg= 0, mt= 0 (v2)
        0.000000  -1.000000  0.000000, # ( 5) sg= 0, mt= 0 (v3)
      ] # vector
    } # Normal IndexedFaceSet { coordIndex [
        0, 3, 2, -1, # face 0 (sg 0, mat 0)
        0, 1, 3, -1, # face 1 (sg 0, mat 0)
      ] # coordIndex normalIndex [
        2, 5, 4, -1, # face 0
        2, 3, 5, -1, # face 1
      ] # normalIndex } # IndexedFaceSet } # Separator doorway[room1]<->[room2]

} # Root Separator

# Closed at 15:28:39
```

The only important information is the Coordinate3 information and the ordering in the IndexedFaceSet. These help locate the mapping between portals by defining which point maps to which. In this case, since the mapping is a "gap" portal, this is of less concern.

APPENDIX F

```
HullList [
 hullName "room1.huf"
 hullName "room2.huf"
]

SubhullList [
]

PortalList [
 MappingPortal {
  portalName     "doorway1"
  portalFilename "doorway1.ptl"
  fromHull       "room1"
  toHull         "room2"
  toObject       "doorway2"
  toObjectFilename "doorway2.ptl"
  clip           0
 }
 MappingPortal {
  portalName     "doorway2"
  portalFilename "doorway2.ptl"
  fromHull       "room2"
  toHull         "room1"
  toObject       "doorway1"
  toObjectFilename "doorway1.ptl"
  clip           0
 }
]

StartList [
 StartPoint {
  startpointName "tester.stp"
  hullName       "room1"
 }
]
```

APPENDIX G

The two portal files are now presented in order to compare and understand how the mapping may be created.

```
#VRML V1.0 ascii

DEF Root Separator {

Info {
  string "Opened as <doorway1.ptl> at <15:29:28> by the TGZ
exporter"
}

MaterialBinding { value PER_FACE_INDEXED }

Material { # default material
  ambientColor [ 0.2 0.2 0.2 ]
  diffuseColor [ 0.8 0.8 0.8 ]
  specularColor [ 0.0 0.0 0.0 ]
  shininess [ 0.2 ]
  transparency [ 0.0 ]
}

DEF doorway1 Separator { # originally "doorway1[room1]-
>doorway2[room2]"

Material {
  ambientColor [ 0.000000  0.000000  0.000000]
  diffuseColor [ 0.000000  0.000000  0.000000]
  specularColor [ 0.900000  0.900000  0.900000]
  shininess [ 0.400000 ]
  transparency [ 0.000000 ]
}

Coordinate3 {
  point [ # (4 verts)
    8.475389  8.986030  -5.051282, # 0
    0.537631  17.541268 -5.051282, # 1
    8.475389  8.986030   6.692700, # 2
    0.537631  17.541268  6.692700, # 3
  ] # point
} # Coordinate3

Normal {
  vector [
    0.000000 -1.000000  0.000000, # ( 0) face 0
    0.000000 -1.000000  0.000000, # ( 1) face 1
    0.000000 -1.000000  0.000000, # ( 2) sg= 0, mtl= 0 (v0)
    0.000000 -1.000000  0.000000, # ( 3) sg= 0, mtl= 0 (v1)
    0.000000 -1.000000  0.000000, # ( 4) sg= 0, mtl= 0 (v2)
    0.000000 -1.000000  0.000000, # ( 5) sg= 0, mtl= 0 (v3)
  ] # vector
} # Normal IndexedFaceSet { coordIndex [
  0,  3,  2, -1, # face 0 (sg 0, mat 0)
  0,  1,  3, -1, # face 1 (sg 0, mat 0)
] # coordIndex normalIndex [
  2,  5,  4, -1, # face 0
  2,  3,  5, -1, # face 1
] # normalIndex } # IndexedFaceSet } # Separator doorway1[room1]->doorway2[room2]

} # Root Separator

# Closed at 15:29:28
```

```
#VRML V1.0 ascii

DEF Root Separator {

Info {
  string "Opened as <doorway2.ptl> at <15:29:28> by the TGZ
exporter"
}

MaterialBinding { value PER_FACE_INDEXED }

Material { # default material
  ambientColor [ 0.2 0.2 0.2 ]
  diffuseColor [ 0.8 0.8 0.8 ]
  specularColor [ 0.0 0.0 0.0 ]
  shininess [ 0.2 ]
  transparency [ 0.0 ]
}

DEF doorway2 Separator { # originally "doorway2[room2]-
>doorway1[room1]"

Material {
  ambientColor [ 0.000000  0.000000  0.000000]
  diffuseColor [ 0.000000  0.000000  0.000000]
  specularColor [ 0.900000  0.900000  0.900000]
  shininess [ 0.400000 ]
  transparency [ 0.000000 ]
}

Coordinate3 {
  point [ # (4 verts)
    -5.692000 -1.662999 -5.051282, # 0
     6.051982 -1.662999 -5.051282, # 1
    -5.692000 -1.662999  6.692700, # 2
     6.051982 -1.662999  6.692700, # 3
  ] # point
} # Coordinate3

Normal {
  vector [
    0.000000 -1.000000  0.000000, # ( 0) face 0
    0.000000 -1.000000  0.000000, # ( 1) face 1
    0.000000 -1.000000  0.000000, # ( 2) sg= 0, mtl= 0 (v0)
    0.000000 -1.000000  0.000000, # ( 3) sg= 0, mtl= 0 (v1)
    0.000000 -1.000000  0.000000, # ( 4) sg= 0, mtl= 0 (v2)
    0.000000 -1.000000  0.000000, # ( 5) sg= 0, mtl= 0 (v3)
  ] # vector
} # Normal IndexedFaceSet { coordIndex [
  0,  3,  2, -1, # face 0 (sg 0, mat 0)
  0,  1,  3, -1, # face 1 (sg 0, mat 0)
] # coordIndex normalIndex [
  2,  5,  4, -1, # face 0
  2,  3,  5, -1, # face 1
] # normalIndex } # IndexedFaceSet } # Separator doorway2[room2]->doorway1[room1]

} # Root Separator

# Closed at 15:29:28
```

The points to look for are the Coordinate3 lists and the IndexedFaceSet coordIndex lists. These are the only important pieces of information in this file. From these pieces of information we can work out which coordinate should map to which in the two files.

APPENDIX H

```
[0.999847,0.000000][0.000000,0.000000]
[0.000000,0.999817][0.000000,0.000000]
[0.000000,0.000000][0.999595,0.000000]
[0.000931,-0.000290][-0.001541,1.000000]

[1.001389,0.000000][0.000000,0.000000]
[0.000000,1.001419][0.000000,0.000000]
[0.000000,0.000000][1.001541,0.000000]
[-0.000931,0.000275][0.001541,1.001236]
```

These are the matrices created to represent the transformation through the portal. The first is the straight transform in the defined direction. The second the inverse.

They are not quite the identity since the calculations are done in fixed point arithmetic which is slightly inaccurate.

There are 30 old polygons.
There are 90 vertex pointers in the polygons.
There are 3 old materials.
There are 1 old dlights and 0 old plights.
There are 6 bsptree nodes.
There are 1 textures.
There are 1 portals.
Inserting materials
Inserting vertices
Inserting polygons
The number of untransformed polygons is 0
Inserting dlights
Inserting plights

46

Inserting portals
Inserting bsp nodes

---

******************NODE***********************
Plane equation for this node : [0.000000,-0.999908][0.000000,-1.662857]
Opp list#####
Same list####
A polygon with 3 vertices
    [-13.748505,-1.663177][15.686050,1.000000] : [5.000000,5.000000]
    [-5.691940,-1.663177][6.692520,1.000000] : [3.462173,2.831573]
    [12.446243,-1.663177][15.686050,1.000000] : [0.000000,5.000000]
Plane equation : 0, -1, 0, -2
A polygon with 3 vertices
    [-13.748505,-1.663177][-5.051468,1.000000] : [5.000000,0.000000]
    [-5.691940,-1.663177][-5.051468,1.000000] : [3.462173,0.000000]
    [-13.748505,-1.663177][15.686050,1.000000] : [5.000000,5.000000]
Plane equation : 0, -1, 0, -2
A polygon with 3 vertices
    [6.052048,-1.663177][-4.544937,1.000000] : [1.220505,0.122116]
    [12.446243,-1.663177][-5.051468,1.000000] : [0.000000,0.000000]
    [12.446243,-1.663177][15.686050,1.000000] : [0.000000,5.000000]
Plane equation : 0, -1, 0, -2
A polygon with 3 vertices
    [12.446243,-1.663177][15.686050,1.000000] : [0.000000,5.000000]
    [-5.691940,-1.663177][6.692520,1.000000] : [3.462173,2.831573]
    [6.052048,-1.663177][6.692520,1.000000] : [1.220505,2.831573]
Plane equation : 0, -1, 0, -2
A polygon with 3 vertices
    [6.052048,-1.663177][-4.544937,1.000000] : [1.220505,0.122116]
    [12.446243,-1.663177][15.686050,1.000000] : [0.000000,5.000000]
    [6.052048,-1.663177][6.692520,1.000000] : [1.220505,2.831573]
Plane equation : 0, -1, 0, -2
A polygon with 3 vertices
    [-5.691940,-1.663177][2.251129,1.000000] : [3.462173,1.760712]
    [-13.748505,-1.663177][15.686050,1.000000] : [5.000000,5.000000]
    [-5.691940,-1.663177][-5.051468,1.000000] : [3.462173,0.000000]
Plane equation : 0, -1, 0, -2
A polygon with 3 vertices
    [-13.748505,-1.663177][15.686050,1.000000] : [5.000000,5.000000]
    [-5.691940,-1.663177][2.251129,1.000000] : [3.462173,1.760712]
    [-5.691940,-1.663177][6.692520,1.000000] : [3.462173,2.831573]
Plane equation : 0, -1, 0, -2
A polygon with 3 vertices
    [6.052048,-1.663177][-4.544937,1.000000] : [1.220505,0.122116]
    [6.052048,-1.663177][-5.051468,1.000000] : [1.220505,0.000000]
    [12.446243,-1.663177][-5.051468,1.000000] : [0.000000,0.000000]
Plane equation : 0, -1, 0, -2
******************NODE***********************
Plane equation for this node : [0.000000,0.999832][0.000000,21.742172]
Opp list#####
Same list####
A polygon with 3 vertices
    [12.446243,-21.745819][-5.051468,1.000000] : [0.000000,0.000000]
    [-13.748505,-21.745819][-5.051468,1.000000] : [5.000000,0.000000]
    [12.446243,-21.745819][15.686050,1.000000] : [0.000000,5.000000]
Plane equation : 0, 1, 0, 22
A polygon with 3 vertices
    [-13.748505,-21.745819][15.686050,1.000000] : [5.000000,5.000000]
    [12.446243,-21.745819][15.686050,1.000000] : [0.000000,5.000000]

There follows the raw output of the bsp tree from the files given in the previous section. It is a little unclear what each represents. A diagram of the resultant bsp trees is given in a few pages in an attempt to clarify the process.

The format of a vertex is 4 values representing a position in cartesian space plus a W co-ordinate to allow homogeneous transforms. Then two digits representing the 2D texture co-ordinate for that vertex.

Note also, that nodes are traversed as follows. Root node, positive sub-tree, negative sub-tree.

```
    [-13.748505,-21.745819][-5.051468,1.000000] : [5.000000,0.000000]
Plane equation : 0, 1, 0, 22
*********************NODE*************************
Plane equation for this node : [0.000000,0.000000][-0.999878,15.684143]
###Opp list#####
Same list####
A polygon with 3 vertices
    [12.446243,-21.745819][15.686050,1.000000] : [0.000000,5.000000]
    [-13.748505,-21.745819][15.686050,1.000000] : [5.000000,5.000000]
    [12.446243,-1.663177][15.686050,1.000000] : [0.000000,0.000000]
Plane equation : 0, 0, -1, 16
A polygon with 3 vertices
    [-13.748505,-1.663177][15.686050,1.000000] : [5.000000,0.000000]
    [12.446243,-1.663177][15.686050,1.000000] : [0.000000,0.000000]
    [-13.748505,-21.745819][15.686050,1.000000] : [5.000000,5.000000]
Plane equation : 0, 0, -1, 16
*********************NODE*************************
Plane equation for this node : [0.000000,0.000000][0.999863,5.050781]
###Opp list#####
Same list####
A polygon with 3 vertices
    [12.446243,-21.745819][-5.051468,1.000000] : [0.000000,5.000000]
    [12.446243,-1.663177][-5.051468,1.000000] : [0.000000,0.000000]
    [-13.748505,-21.745819][-5.051468,1.000000] : [5.000000,5.000000]
Plane equation : 0, 0, 1, 5
A polygon with 3 vertices
    [-13.748505,-21.745819][-5.051468,1.000000] : [5.000000,5.000000]
    [6.052048,-3.301865][-5.051468,1.000000] : [1.220505,0.407974]
    [-5.691940,-3.301865][-5.051468,1.000000] : [3.462173,0.407974]
Plane equation : 0, 0, 1, 5
A polygon with 3 vertices
    [-13.748505,-1.663177][-5.051468,1.000000] : [5.000000,0.000000]
    [-13.748505,-21.745819][-5.051468,1.000000] : [5.000000,5.000000]
    [-5.691940,-3.301865][-5.051468,1.000000] : [3.462173,0.407974]
Plane equation : 0, 0, 1, 5
A polygon with 3 vertices
    [-13.748505,-21.745819][-5.051468,1.000000] : [5.000000,5.000000]
    [12.446243,-1.663177][-5.051468,1.000000] : [0.000000,0.000000]
    [6.052048,-3.301865][-5.051468,1.000000] : [1.220505,0.407974]
Plane equation : 0, 0, 1, 5
A polygon with 3 vertices
    [6.052048,-1.898224][-5.051468,1.000000] : [1.220505,0.058517]
    [-5.691940,-2.329941][-5.051468,1.000000] : [3.462173,0.166000]
    [6.052048,-3.301865][-5.051468,1.000000] : [1.220505,0.407974]
Plane equation : 0, 0, 1, 5
A polygon with 3 vertices
    [6.052048,-3.301865][-5.051468,1.000000] : [1.220505,0.407974]
    [-5.691940,-2.329941][-5.051468,1.000000] : [3.462173,0.166000]
    [-5.691940,-3.301865][-5.051468,1.000000] : [3.462173,0.407974]
Plane equation : 0, 0, 1, 5
A polygon with 3 vertices
    [12.446243,-1.663177][-5.051468,1.000000] : [0.000000,0.000000]
    [6.052048,-1.898224][-5.051468,1.000000] : [1.220505,0.058517]
    [6.052048,-3.301865][-5.051468,1.000000] : [1.220505,0.407974]
Plane equation : 0, 0, 1, 5
A polygon with 3 vertices
    [-5.691940,-2.329941][-5.051468,1.000000] : [3.462173,0.166000]
    [-13.748505,-1.663177][-5.051468,1.000000] : [5.000000,0.000000]
    [-5.691940,-3.301865][-5.051468,1.000000] : [3.462173,0.407974]
Plane equation : 0, 0, 1, 5
A polygon with 3 vertices
```

```
        [-5.691940,-1.663177][-5.051468,1.000000] : [3.462173,0.000000]
        [-13.748505,-1.663177][-5.051468,1.000000] : [5.000000,0.000000]
        [-5.691940,-2.329941][-5.051468,1.000000] : [3.462173,0.166000]
Plane equation : 0, 0, 1, 5
A polygon with 3 vertices
        [6.052048,-1.663177][-5.051468,1.000000] : [1.220505,0.000000]
        [-1.312759,-1.663177][-5.051468,1.000000] : [2.626282,0.000000]
        [-5.691940,-2.329941][-5.051468,1.000000] : [3.462173,0.166000]
Plane equation : 0, 0, 1, 5
A polygon with 3 vertices
        [-5.691940,-2.329941][-5.051468,1.000000] : [3.462173,0.166000]
        [6.052048,-1.898224][-5.051468,1.000000] : [1.220505,0.058517]
        [6.052048,-1.663177][-5.051468,1.000000] : [1.220505,0.000000]
Plane equation : 0, 0, 1, 5
A polygon with 3 vertices
        [-1.312759,-1.663177][-5.051468,1.000000] : [2.626282,0.000000]
        [-3.979736,-1.663177][-5.051468,1.000000] : [3.135345,0.000000]
        [-5.691940,-2.329941][-5.051468,1.000000] : [3.462173,0.166000]
Plane equation : 0, 0, 1, 5
A polygon with 3 vertices
        [6.052048,-1.898224][-5.051468,1.000000] : [1.220505,0.058517]
        [12.446243,-1.663177][-5.051468,1.000000] : [0.000000,0.000000]
        [6.052048,-1.663177][-5.051468,1.000000] : [1.220505,0.000000]
Plane equation : 0, 0, 1, 5
A polygon with 3 vertices
        [-3.979736,-1.663177][-5.051468,1.000000] : [3.135345,0.000000]
        [-5.691940,-1.663177][-5.051468,1.000000] : [3.462173,0.000000]
        [-5.691940,-2.329941][-5.051468,1.000000] : [3.462173,0.166000]
Plane equation : 0, 0, 1, 5
*******************NODE*************************
Plane equation for this node : [-0.999695,0.000000][0.000000,12.442459]
###Opp list#####
Same list####
A polygon with 3 vertices
        [12.446243,-1.663177][-5.051468,1.000000] : [0.000000,0.000000]
        [12.446243,-21.745819][-5.051468,1.000000] : [5.000000,0.000000]
        [12.446243,-1.663177][15.686050,1.000000] : [0.000000,5.000000]
Plane equation : -1, 0, 0, 12
A polygon with 3 vertices
        [12.446243,-21.745819][15.686050,1.000000] : [5.000000,5.000000]
        [12.446243,-1.663177][15.686050,1.000000] : [0.000000,5.000000]
        [12.446243,-21.745819][-5.051468,1.000000] : [5.000000,0.000000]
Plane equation : -1, 0, 0, 12
*******************NODE*************************
Plane equation for this node : [0.999664,0.000000][0.000000,13.743896]
###Opp list#####
Same list####
A polygon with 3 vertices
        [-13.748505,-21.745819][-5.051468,1.000000] : [5.000000,0.000000]
        [-13.748505,-1.663177][-5.051468,1.000000] : [0.000000,0.000000]
        [-13.748505,-21.745819][15.686050,1.000000] : [5.000000,5.000000]
Plane equation : 1, 0, 0, 14
A polygon with 3 vertices
        [-13.748505,-1.663177][15.686050,1.000000] : [0.000000,5.000000]
        [-13.748505,-21.745819][15.686050,1.000000] : [5.000000,5.000000]
        [-13.748505,-1.663177][-5.051468,1.000000] : [0.000000,0.000000]
Plane equation : 1, 0, 0, 14
!@!@!@!@ END OF POSITIVE SUBTREE !@!@!@!@
!@!@!@!@ END OF NEGATIVE SUBTREE !@!@!@!@
!@!@!@!@ END OF NEGATIVE SUBTREE !@!@!@!@
!@!@!@!@ END OF NEGATIVE SUBTREE !@!@!@!@
```

!@!@!@!@ END OF NEGATIVE SUBTREE !@!@!@!@
!@!@!@!@ END OF NEGATIVE SUBTREE !@!@!@!@
!@!@!@!@ END OF NEGATIVE SUBTREE !@!@!@!@

*******************NODE***********************
Plane equation for this node : [0.000000,0.999893][0.000000,1.662842]
Opp list#####
Same list####
*******************NODE***********************
Plane equation for this node : [0.000000,0.000000][-0.999649,18.430038]
Opp list#####
Same list####
A polygon with 3 vertices
    [13.865128,1.092728][18.436508,1.000000] : [0.000000,4.570938]
    [-15.494827,1.092728][18.436508,1.000000] : [5.000000,4.570938]
    [13.865128,30.452682][18.436508,1.000000] : [0.000000,0.000000]
Plane equation : 0, 0, -1, 18
A polygon with 3 vertices
    [-15.494827,30.452682][18.436508,1.000000] : [4.999985,0.000000]
    [13.865128,30.452682][18.436508,1.000000] : [0.000000,0.000000]
    [-15.494827,1.092728][18.436508,1.000000] : [5.000000,4.570938]
Plane equation : 0, 0, -1, 18
*******************NODE***********************
Plane equation for this node : [0.000000,0.000000][0.999634,5.049622]
Opp list#####
Same list####
A polygon with 3 vertices
    [-15.494827,30.452682][-5.051468,1.000000] : [4.999985,0.000000]
    [-15.494827,1.092728][-5.051468,1.000000] : [5.000000,4.570938]
    [13.865128,30.452682][-5.051468,1.000000] : [0.000000,0.000000]
Plane equation : 0, 0, 1, 5
A polygon with 3 vertices
    [6.052048,2.570129][-5.051468,1.000000] : [1.330566,4.340927]
    [13.865128,30.452682][-5.051468,1.000000] : [0.000000,0.000000]
    [-5.691940,2.570129][-5.051468,1.000000] : [3.330566,4.340927]
Plane equation : 0, 0, 1, 5
A polygon with 3 vertices
    [13.865128,30.452682][-5.051468,1.000000] : [0.000000,0.000000]
    [-15.494827,1.092728][-5.051468,1.000000] : [5.000000,4.570938]
    [-5.691940,2.570129][-5.051468,1.000000] : [3.330566,4.340927]
Plane equation : 0, 0, 1, 5
A polygon with 3 vertices
    [13.865128,1.092728][-5.051468,1.000000] : [0.000000,4.570938]
    [13.865128,30.452682][-5.051468,1.000000] : [0.000000,0.000000]
    [6.052048,2.570129][-5.051468,1.000000] : [1.330566,4.340927]
Plane equation : 0, 0, 1, 5
A polygon with 3 vertices
    [-5.691940,1.092728][-5.051468,1.000000] : [3.330566,4.570938]
    [-5.691940,-1.663177][-5.051468,1.000000] : [3.330566,5.000000]
    [3.097244,1.092728][-5.051468,1.000000] : [1.833771,4.570938]
Plane equation : 0, 0, 1, 5
A polygon with 3 vertices
    [6.052048,1.092728][-5.051468,1.000000] : [1.330566,4.570938]
    [-1.312759,-1.663177][-5.051468,1.000000] : [2.584793,5.000000]
    [6.052048,-1.663177][-5.051468,1.000000] : [1.330566,5.000000]
Plane equation : 0, 0, 1, 5
A polygon with 3 vertices
    [6.052048,2.570129][-5.051468,1.000000] : [1.330566,4.340927]
    [-5.691940,1.764877][-5.051468,1.000000] : [3.330566,4.466293]

50

[6.052048,1.092728][-5.051468,1.000000] : [1.330566,4.570938]
Plane equation : 0, 0, 1, 5
A polygon with 3 vertices
    [6.052048,1.092728][-5.051468,1.000000] : [1.330566,4.570938]
    [13.865128,1.092728][-5.051468,1.000000] : [0.000000,4.570938]
    [6.052048,2.570129][-5.051468,1.000000] : [1.330566,4.340927]
Plane equation : 0, 0, 1, 5
A polygon with 3 vertices
    [-5.691940,1.764877][-5.051468,1.000000] : [3.330566,4.466293]
    [6.052048,2.570129][-5.051468,1.000000] : [1.330566,4.340927]
    [-5.691940,2.570129][-5.051468,1.000000] : [3.330566,4.340927]
Plane equation : 0, 0, 1, 5
A polygon with 3 vertices
    [-1.312759,-1.663177][-5.051468,1.000000] : [2.584793,5.000000]
    [6.052048,1.092728][-5.051468,1.000000] : [1.330566,4.570938]
    [3.097244,1.092728][-5.051468,1.000000] : [1.833771,4.570938]
Plane equation : 0, 0, 1, 5
A polygon with 3 vertices
    [-15.494827,1.092728][-5.051468,1.000000] : [5.000000,4.570938]
    [-5.691940,1.764877][-5.051468,1.000000] : [3.330566,4.466293]
    [-5.691940,2.570129][-5.051468,1.000000] : [3.330566,4.340927]
Plane equation : 0, 0, 1, 5
A polygon with 3 vertices
    [3.097244,1.092728][-5.051468,1.000000] : [1.833771,4.570938]
    [-3.979736,-1.663177][-5.051468,1.000000] : [3.038971,5.000000]
    [-1.312759,-1.663177][-5.051468,1.000000] : [2.584793,5.000000]
Plane equation : 0, 0, 1, 5
A polygon with 3 vertices
    [-15.494827,1.092728][-5.051468,1.000000] : [5.000000,4.570938]
    [-5.691940,1.092728][-5.051468,1.000000] : [3.330566,4.570938]
    [-5.691940,1.764877][-5.051468,1.000000] : [3.330566,4.466293]
Plane equation : 0, 0, 1, 5
A polygon with 3 vertices
    [-5.691940,1.092728][-5.051468,1.000000] : [3.330566,4.570938]
    [3.097244,1.092728][-5.051468,1.000000] : [1.833771,4.570938]
    [-5.691940,1.764877][-5.051468,1.000000] : [3.330566,4.466293]
Plane equation : 0, 0, 1, 5
A polygon with 3 vertices
    [-3.979736,-1.663177][-5.051468,1.000000] : [3.038971,5.000000]
    [3.097244,1.092728][-5.051468,1.000000] : [1.833771,4.570938]
    [-5.691940,-1.663177][-5.051468,1.000000] : [3.330566,5.000000]
Plane equation : 0, 0, 1, 5
A polygon with 3 vertices
    [3.097244,1.092728][-5.051468,1.000000] : [1.833771,4.570938]
    [6.052048,1.092728][-5.051468,1.000000] : [1.330566,4.570938]
    [-5.691940,1.764877][-5.051468,1.000000] : [3.330566,4.466293]
Plane equation : 0, 0, 1, 5
******************NODE**********************
Plane equation for this node : [-0.999649,0.000000][0.000000,13.860275]
Opp list#####
Same list####
A polygon with 3 vertices
    [13.865128,30.452682][-5.051468,1.000000] : [0.000000,0.000000]
    [13.865128,1.092728][-5.051468,1.000000] : [4.570938,0.000000]
    [13.865128,30.452682][18.436508,1.000000] : [0.000000,5.000000]
Plane equation : -1, 0, 0, 14
A polygon with 3 vertices
    [13.865128,1.092728][18.436508,1.000000] : [4.570938,5.000000]
    [13.865128,30.452682][18.436508,1.000000] : [0.000000,5.000000]
    [13.865128,1.092728][-5.051468,1.000000] : [4.570938,0.000000]
Plane equation : -1, 0, 0, 14

51

```
*********************NODE*************************
Plane equation for this node : [0.000000,-0.999649][0.000000,30.442001]
###Opp list#####
Same list####
A polygon with 3 vertices
    [-15.494827,30.452682][-5.051468,1.000000] : [4.999985,0.000000]
    [13.865128,30.452682][-5.051468,1.000000] : [0.000000,0.000000]
    [-15.494827,30.452682][18.436508,1.000000] : [4.999985,5.000000]
Plane equation : 0, -1, 0, 30
A polygon with 3 vertices
    [13.865128,30.452682][18.436508,1.000000] : [0.000000,5.000000]
    [-15.494827,30.452682][18.436508,1.000000] : [4.999985,5.000000]
    [13.865128,30.452682][-5.051468,1.000000] : [0.000000,0.000000]
Plane equation : 0, -1, 0, 30
*********************NODE*************************
Plane equation for this node : [0.999634,0.000000][0.000000,15.489166]
###Opp list#####
Same list####
A polygon with 3 vertices
    [-15.494827,1.092728][-5.051468,1.000000] : [4.570938,0.000000]
    [-15.494827,30.452682][-5.051468,1.000000] : [0.000000,0.000000]
    [-15.494827,1.092728][18.436508,1.000000] : [4.570938,5.000000]
Plane equation : 1, 0, 0, 15
A polygon with 3 vertices
    [-15.494827,30.452682][18.436508,1.000000] : [0.000000,5.000000]
    [-15.494827,1.092728][18.436508,1.000000] : [4.570938,5.000000]
    [-15.494827,30.452682][-5.051468,1.000000] : [0.000000,0.000000]
Plane equation : 1, 0, 0, 15
*********************NODE*************************
Plane equation for this node : [0.000000,0.999969][0.000000,-1.092682]
###Opp list#####
Same list####
A polygon with 3 vertices
    [13.865128,1.092728][18.436508,1.000000] : [0.000000,5.000000]
    [6.052048,1.092728][6.692520,1.000000] : [1.330566,2.500000]
    [-15.494827,1.092728][18.436508,1.000000] : [5.000000,5.000000]
Plane equation : 0, 1, 0, -1
A polygon with 3 vertices
    [-5.691940,1.092728][6.692520,1.000000] : [3.330566,2.500000]
    [-15.494827,1.092728][-5.051468,1.000000] : [5.000000,0.000000]
    [-15.494827,1.092728][18.436508,1.000000] : [5.000000,5.000000]
Plane equation : 0, 1, 0, -1
A polygon with 3 vertices
    [13.865128,1.092728][-5.051468,1.000000] : [0.000000,0.000000]
    [6.052048,1.092728][-5.051468,1.000000] : [1.330566,0.000000]
    [13.865128,1.092728][18.436508,1.000000] : [0.000000,5.000000]
Plane equation : 0, 1, 0, -1
A polygon with 3 vertices
    [-15.494827,1.092728][18.436508,1.000000] : [5.000000,5.000000]
    [6.052048,1.092728][6.692520,1.000000] : [1.330566,2.500000]
    [-5.691940,1.092728][6.692520,1.000000] : [3.330566,2.500000]
Plane equation : 0, 1, 0, -1
A polygon with 3 vertices
    [-15.494827,1.092728][-5.051468,1.000000] : [5.000000,0.000000]
    [-5.691940,1.092728][6.692520,1.000000] : [3.330566,2.500000]
    [-5.691940,1.092728][-3.493500,1.000000] : [3.330566,0.331650]
Plane equation : 0, 1, 0, -1
A polygon with 3 vertices
    [6.052048,1.092728][1.393845,1.000000] : [1.330566,1.372040]
    [13.865128,1.092728][18.436508,1.000000] : [0.000000,5.000000]
    [6.052048,1.092728][-5.051468,1.000000] : [1.330566,0.000000]
```

52

Plane equation : 0, 1, 0, -1
A polygon with 3 vertices
    [6.052048,1.092728][1.393845,1.000000] : [1.330566,1.372040]
    [6.052048,1.092728][6.692520,1.000000] : [1.330566,2.500000]
    [13.865128,1.092728][18.436508,1.000000] : [0.000000,5.000000]
Plane equation : 0, 1, 0, -1
A polygon with 3 vertices
    [-5.691940,1.092728][-5.051468,1.000000] : [3.330566,0.000000]
    [-15.494827,1.092728][-5.051468,1.000000] : [5.000000,0.000000]
    [-5.691940,1.092728][-3.493500,1.000000] : [3.330566,0.331650]
Plane equation : 0, 1, 0, -1
!@!@!@!@ END OF POSITIVE SUBTREE !@!@!@!@
*******************NODE***********************
Plane equation for this node : [0.000000,0.000000][-0.999573,6.689667]
Opp list#####
Same list####
A polygon with 3 vertices
    [-5.691940,-1.663177][6.692520,1.000000] : [3.330566,5.000000]
    [-5.691940,1.092728][6.692520,1.000000] : [3.330566,4.570938]
    [6.052048,1.092728][6.692520,1.000000] : [1.330566,4.570938]
Plane equation : 0, 0, -1, 7
A polygon with 3 vertices
    [6.052048,1.092728][6.692520,1.000000] : [1.330566,4.570938]
    [6.052048,-1.663177][6.692520,1.000000] : [1.330566,5.000000]
    [-5.691940,-1.663177][6.692520,1.000000] : [3.330566,5.000000]
Plane equation : 0, 0, -1, 7
*******************NODE***********************
Plane equation for this node : [-0.999939,0.000000][0.000000,6.051682]
Opp list#####
Same list####
A polygon with 3 vertices
    [6.052048,-1.663177][6.692520,1.000000] : [5.000000,2.500000]
    [6.052048,1.092728][6.692520,1.000000] : [4.570938,2.500000]
    [6.052048,-1.663177][-4.544937,1.000000] : [5.000000,0.107819]
Plane equation : -1, 0, 0, 6
A polygon with 3 vertices
    [6.052048,1.092728][-5.051468,1.000000] : [4.570938,0.000000]
    [6.052048,-1.663177][-5.051468,1.000000] : [5.000000,0.000000]
    [6.052048,1.092728][1.393845,1.000000] : [4.570938,1.372040]
Plane equation : -1, 0, 0, 6
A polygon with 3 vertices
    [6.052048,-1.663177][-4.544937,1.000000] : [5.000000,0.107819]
    [6.052048,1.092728][6.692520,1.000000] : [4.570938,2.500000]
    [6.052048,1.092728][1.393845,1.000000] : [4.570938,1.372040]
Plane equation : -1, 0, 0, 6
A polygon with 3 vertices
    [6.052048,-1.663177][-4.544937,1.000000] : [5.000000,0.107819]
    [6.052048,1.092728][1.393845,1.000000] : [4.570938,1.372040]
    [6.052048,-1.663177][-5.051468,1.000000] : [5.000000,0.000000]
Plane equation : -1, 0, 0, 6
*******************NODE***********************
Plane equation for this node : [0.998886,0.000000][0.000000,5.685608]
Opp list#####
Same list####
A polygon with 3 vertices
    [-5.691940,-1.663177][2.251129,1.000000] : [5.000000,1.554535]
    [-5.691940,1.092728][-3.493500,1.000000] : [4.570938,0.331650]
    [-5.691940,1.092728][6.692520,1.000000] : [4.570938,2.500000]
Plane equation : 1, 0, 0, 6
A polygon with 3 vertices
    [-5.691940,-1.663177][-5.051468,1.000000] : [5.000000,0.000000]

```
        [-5.691940,1.092728][-5.051468,1.000000] : [4.570938,0.000000]
        [-5.691940,-1.663177][2.251129,1.000000] : [5.000000,1.554535]
Plane equation : 1, 0, 0, 6
A polygon with 3 vertices
        [-5.691940,1.092728][6.692520,1.000000] : [4.570938,2.500000]
        [-5.691940,-1.663177][6.692520,1.000000] : [5.000000,2.500000]
        [-5.691940,-1.663177][2.251129,1.000000] : [5.000000,1.554535]
Plane equation : 1, 0, 0, 6
A polygon with 3 vertices
        [-5.691940,-1.663177][2.251129,1.000000] : [5.000000,1.554535]
        [-5.691940,1.092728][-5.051468,1.000000] : [4.570938,0.000000]
        [-5.691940,1.092728][-3.493500,1.000000] : [4.570938,0.331650]
Plane equation : 1, 0, 0, 6
!@!@!@!@ END OF POSITIVE SUBTREE !@!@!@!@
!@!@!@!@ END OF NEGATIVE SUBTREE !@!@!@!@
!@!@!@!@ END OF NEGATIVE SUBTREE !@!@!@!@
!@!@!@!@ END OF NEGATIVE SUBTREE !@!@!@!@
!@!@!@!@ END OF NEGATIVE SUBTREE !@!@!@!@
!@!@!@!@ END OF NEGATIVE SUBTREE !@!@!@!@
!@!@!@!@ END OF NEGATIVE SUBTREE !@!@!@!@
!@!@!@!@ END OF NEGATIVE SUBTREE !@!@!@!@
!@!@!@!@ END OF NEGATIVE SUBTREE !@!@!@!@
!@!@!@!@ END OF NEGATIVE SUBTREE !@!@!@!@
```

APPENDIX I

...ally, consider the ... ...oly... ... The initial view-point for the renderer can be represented by the following 4×4 matrix:

$$\begin{bmatrix} -5.695511 & 0.21611 & 0.093597 & 0.0009 \\ -2.648422 & -1.1121841 & -0.485916 & -0.004684 \\ 0 & 4.569748 & 0 & 0 \\ 32.809418 & -10.086472 & 3.4422 & 0.071198 \end{bmatrix}$$

This matrix is a composition of several transforms that must be applied to a given polygon in world space. These are, transform to viewing space, normalise to viewing frustum, scale to viewport (there are a few others, the normalisation also includes the perspective projection to make objects that are further away seem smaller).

When this matrix is applied to a polygon, let us say the polygon representing the left wall of the porch in the room, then the following occurs:

Original polygon:

A polygon with 3 vertices
[-5.691940,-1.663177][6.692520,1.000000] : [3.330566,5.000000]
[-5.691940,1.092728][6.692520,1.000000] : [3.330566,4.570938]
[6.052048,1.092728][6.692520,1.000000] : [1.330566,4.570938]
Plane equation : 0, 0, -1, 7
A polygon with 3 vertices
[6.052048,1.092728][6.692520,1.000000] : [1.330566,4.570938]
[6.052048,-1.663177][6.692520,1.000000] : [1.330566,5.000000]
[-5.691940,-1.663177][6.692520,1.000000] : [3.330566,5.000000]
Plane equation : 0, 0, -1, 7

Transformed points:

```
69.632706   21.132309   3.717590   0.073853
62.333908   18.040619   2.378464   0.060944
-4.554108   20.578613   3.477676   0.071518
2.744690    23.670303   4.816803   0.084427
```

Now if we normalise these co-ordinates:

```
942.85548    286.14016   50.337698
1022.8063    296.01961   39.027041
-63.677787   287.74033   48.626584
32.509624    280.36414   57.052874
```

As can be seen this is a polygon that will cross a viewport (screen) of resolution 640x480 roughly in the centre.

Traversing through the portal to the hull on the far side makes no difference to the matrix applied to co-ordinates in the scene, therefore, any points in the other hull will undergo an identical transform. Hence, the doorway that is actually attached to some of the points in the previous example will appear at the same place on the screen.

Appendix J

The matrix for transform from source to destination hull:

$$\begin{bmatrix} 0.675781 & 0.736847 & 0 & 0 \\ -0.736877 & 0.675751 & 0 & 0 \\ 0 & 0 & 0.999634 & 0 \\ 6.946091 & -13.980377 & 0.002457 & 1.0 \end{bmatrix}$$

The inverse transformation for transform in the opposite direction (and is also used for other purposes during motion through portals).

$$\begin{bmatrix} 0.676971 & -0.738205 & 0 & 0 \\ 0.738235 & 0.677002 & 0 & 0 \\ 0 & 0 & 1.001801 & 0 \\ 5.618362 & 14.592484 & -0.002441 & 1.001434 \end{bmatrix}$$

When the portal is traversed this time, this extra matrix is composed onto the one given as example in the previous section which represents the viewpoint. The combination of these two make the target hull appear joined to the source hull as for the example in the previous section.

What is claimed is:

1. A method of generating compressed image data defining a 3-D image to be rendered in 2-D comprising:

defining in the image a plurality of hulls, each hull being defined as a set of polygons in a designated coordinate system;

defining for each of at least some of said hulls a portal, each portal, each portal being defined as a set of points in the designated coordinate system for that hull and a viewing transform for mapping the portal to another target hull, said target hull being defined in a different designated coordinate system from the designated coordinate system in which the portal being mapped is defined, wherein each hull and its at least one portal are defined in an independent coordinate system; and storing a data structure which holds the defined hulls and portals in a manner describing their physical relationship in the image, the data structure representing the compressed image data.

2. A method according to claim 1, wherein the definition of each portal includes an inverse viewing transform for mapping the portal from the target hull to the hull in which the portal is defined.

3. A method according to claim 1 or 2, wherein the data structure comprises:

an index in which each polygon is stored as a group of identifiers; and a list in which each identifier denotes a point in the designated coordinate system in which the polygon is defined.

4. A method according to claim 3, wherein the data structure holds, for each polygon, polygon properties such as colour and texture.

5. A method according to claim 4, wherein the data structure is in the form of a BSP tree.

6. A method according to claim 5, wherein each portal is defined as four co-planar points.

7. A method according to claim 6, wherein the four co-planar points from a convex quadrilateral.

8. A method according to claim 7, when applied to an image in which objects are moving, wherein moving objects are defined in the data structure as respective sub-hulls, each with an associated moving portal in the hull containing the sub-hull.

9. A method of operating a computer system to generate compressed image data defining a 3-D image to be rendered in 2-D, comprising:

displaying a representation of the 3-D image on a display;

operating a user interface to define in the representation of the image a plurality of hulls and, for each of at least some of said hulls, a portal, wherein the computer system defines each hull as a set of polygons in a designated coordinate system, and defines a portal as a set of points in the designated coordinated system for that hull and a viewing transform for mapping the portal to another target hull, said target hull being defined in a different designated coordinate system from the designated coordinate system in which the portal being mapped is defined, wherein each hull and its at least one portal are defined in an independent coordinate system; and storing in a memory of the computer system a data structure which holds the defined hulls and portals in a manner describing their relationship in the image, the data structure representing the compressed image data.

10. A computer system for generating compress image data defining a 3-D image to be rendered in 2-D, the computer system comprising;

an interface for allowing a user to define in a representation of the 3-D image a plurality of hulls and, for each of at least some of said hulls, a portal;

a processor for defining each hull as a set of polygons in a designated coordinate system, and each portal as a set of points in the designated coordinate system for the hull with which it is associated and a viewing transform for mapping the portal to another target hull, said target hull being defined in a different designated coordinate system from the designated coordinate system in which the portal being mapped is defined, wherein each hull and its at least one portal are defined in an independent coordinate system; and a memory holding a data structure which holds the defined hulls and portals in a manner describing their physical relationship in the image, the data structure representing the compressed image data.

11. A computer system according to claim 10, wherein the definition of each portal includes an inverse viewing transform for mapping the portal from the target to the hull in which the portal is defined.

12. A computer system according to claim 10 or 11, wherein the data structure stored in the memory comprises an index in which each polygon is stored as a group of identifiers, and a list in which each identifier denotes a point in the designated coordinate system in which the polygon is defined.

13. A computer system according to claim 12, wherein the memory holds in the data structure for each polygon, polygon properties such as colour and texture.

14. A computer system according to claim 13, wherein the data structure is in the form of a BSP tree.

15. A computer system according to claim 14, wherein each portal is defined as four co-planar points.

16. A computer system according to claim 15, wherein the four co-planar points form a convex quadrilateral.

17. A computer system according to claim 16, wherein moving objects in the image are defined in a data structure as respective sub-hulls, each with an associated moving portal in the hull containing the sub-hull.

18. A computer system according to claim 10, which comprises a communications interface for transmitting the compressed image data to an image rendering device.

19. A method of rendering an image from compressed image data which is in the form of a data structure which holds data defining hulls and portals in manner describing their physical relationship in the image, wherein each hull is defined as a set of polygons in a designated coordinate system and has a portal defined as a set of points in that designated coordinate system and a viewing transform for mapping that portal to another target hull, said target hull being defined in a different designated coordinate system from the designated coordinate system in which the portal being mapped is defined, wherein each hull and its at least one portal are defined in an independent coordinate system, the method comprising:

traversing the data structure according to a selected view point and selecting hulls and portals visible from what viewpoint;

rendering the visible hulls and portals in sequence by generating pixel data from the data held in the data structure for each hull and portal; and when a portal is encountered, rendering the target hull according to the viewing transform associated with that portal.

20. A method according to claim 19, wherein only a portion of the target hull is rendered by applying a clipping algorithm prior to generating the pixel data.

21. A method according to claim 20, where the clipping algorithm is frustum culling.

22. A method according to claim 20, wherein prior to rendering the visible hulls and portals, the designated coordinated system for those hulls and portals are mapped onto a common coordinate system in which the pixel data is rendered.

23. An image rendering device having a communications interface for receiving compressed image data which is in the form of a data structure which holds data defining hulls and portals in a manner describing their physical relationship in an image, wherein each hull is defined as a set of polygons in a designated coordinate system and has a portal defined as a set of points in that designated coordinate system and a viewing transform for mapping that portal to another target hull, said target hull being defined in a different designated coordinate system from the designated coordinate system in which the portal being mapped is defined, wherein each hull and its at least one portal are defined in an independent coordinate system;

- a processor for traversing the data structure according to a selected viewpoint and selecting hulls and portals visible from that viewpoint;
- pixel data generating means for generating pixel data from the data held in the data structure for each of the visible hulls and portals, thereby to render those hulls and portals in sequence in such a manner that, when a portal is encountered, the target hull is rendered according to the viewing transform associated with that portal.

24. An image rendering device according to claim 23, which includes a display for displaying pixels according to the generated pixel data.

25. A image rendering device according to claim 23, which includes a user interface operable to allow portals to be generated by a user on the rendered image.

26. A data carrier comprising a computer readable medium holding a data structure which holds compressed image data which represents hulls and portals in a manner describing their physical relationship in an image, wherein each hull is defined as a set of polygons in a designated coordinate system and has a portal defined as a set of points in that designated coordinate system and a viewing transform for mapping that portal to another target hull, said target hull being defined in a different designated coordinate system from the designated coordinate system in which the portal being mapped is defined.

* * * * *